United States Patent
Kasai et al.

(10) Patent No.: US 10,940,629 B2
(45) Date of Patent: Mar. 9, 2021

(54) ETHYLENE-TETRAFLUOROETHYLENE COPOLYMER FILM AND METHOD FOR PRODUCING SAME

(71) Applicant: AGC Inc., Chiyoda-ku (JP)

(72) Inventors: Wataru Kasai, Chiyoda-ku (JP); Kengo Kawahara, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/191,768

(22) Filed: Nov. 15, 2018

(65) Prior Publication Data

US 2019/0085107 A1 Mar. 21, 2019

Related U.S. Application Data

(63) Continuation of application No. PCT/JP2017/024236, filed on Jun. 30, 2017.

(30) Foreign Application Priority Data

Jul. 4, 2016 (JP) .............................. JP2016-132442

(51) Int. Cl.
*B29C 48/885* (2019.01)
*C08J 5/18* (2006.01)
(Continued)

(52) U.S. Cl.
CPC .......... *B29C 48/885* (2019.02); *B29C 48/022* (2019.02); *B29C 48/08* (2019.02);
(Continued)

(58) Field of Classification Search
None
See application file for complete search history.

(56) References Cited

U.S. PATENT DOCUMENTS 6,197,904 B1 * 3/2001 Gangal ................. C08F 210/02
526/242
2002/0195744 A1 12/2002 Otsuki et al.
(Continued)

FOREIGN PATENT DOCUMENTS

CN 1497013 A 5/2004
CN 105705308 A 6/2016
(Continued)

OTHER PUBLICATIONS

Funaki et al. "Influence of third monomer on the crystal phase transition behavior of ethylene-tetrafluoroethylene copolymer", Polymer 49 (2008) 5497-5503 (Year: 2008).*
(Continued)

*Primary Examiner* — Nicole M. Buie-Hatcher
(74) *Attorney, Agent, or Firm* — Oblon, McClelland, Maier & Neustadt, L.L.P.

(57) ABSTRACT

To provide an ETFE film which is unlikely to wrinkle when stretched and retracted, and a method for producing the same. It is an ethylene-tetrafluoroethylene copolymer film characterized in that the crystallinity obtained by the formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17°$ in the diffraction intensity curve obtained by the X-ray diffraction method, is from 55 to 70%, and the proportion of the quasi-crystal layer obtained by the formula (2) is from 10 to 20%:

$$\text{crystallinity (\%)} = (S_{19}+S_2)/(S_{17}+S_{19}+S_{20}) \times 100 \quad (1)$$

$$\text{proportion of quasi-crystal layer (\%)} = S_{20}/(S_{17}+S_{19}+S_{20}) \times 100 \quad (2).$$

12 Claims, 2 Drawing Sheets

(51) Int. Cl.
    *B29C 48/08*          (2019.01)
    *B29C 48/305*       (2019.01)
    *B29C 48/88*         (2019.01)
    *C08F 210/02*       (2006.01)
    *C08F 214/26*       (2006.01)
    *B29K 627/18*       (2006.01)
    *B29K 23/00*         (2006.01)
    *B29K 27/18*         (2006.01)
    *B29L 7/00*          (2006.01)
    *C08L 27/18*        (2006.01)
    *C08L 23/08*        (2006.01)
    *B29C 48/00*         (2019.01)
    *B29K 627/12*       (2006.01)

(52) U.S. Cl.
    CPC .......... *B29C 48/305* (2019.02); *B29C 48/914* (2019.02); *C08F 210/02* (2013.01); *C08F 214/265* (2013.01); *C08J 5/18* (2013.01); *C08L 23/0892* (2013.01); *C08L 27/18* (2013.01); *B29K 2023/08* (2013.01); *B29K 2027/18* (2013.01); *B29K 2627/12* (2013.01); *B29K 2627/18* (2013.01); *B29L 2007/00* (2013.01); *C08F 2500/26* (2013.01); *C08F 2800/20* (2013.01); *C08J 2327/18* (2013.01); *C08J 2427/18* (2013.01); *C08L 2205/025* (2013.01)

(56) References Cited

U.S. PATENT DOCUMENTS

2004/0116606 A1 * 6/2004 Sumi ................ C08L 27/18
                                                  525/199
2014/0335634 A1   11/2014 Kasai et al.
2015/0252156 A1   9/2015 Kouketsu et al.
2015/0321387 A1   11/2015 Bravet et al.
2016/0189985 A1   6/2016 Kasai et al.
2016/0189986 A1   6/2016 Kasai et al.
2016/0368177 A1   12/2016 Kasai et al.
2017/0088651 A1   3/2017 Aida et al.
2017/0101529 A1   4/2017 Terada et al.

FOREIGN PATENT DOCUMENTS

| | | |
|---|---|---|
| JP | 61-27231 | 2/1986 |
| JP | 2001-168117 | 6/2001 |
| JP | 2002-110722 | 4/2002 |
| JP | WO2013/115187 A1 | 8/2013 |
| JP | 2013-180461 | 9/2013 |
| JP | 2014-141646 | 8/2014 |
| JP | 2015-519728 | 7/2015 |
| JP | 2015-157488 | 9/2015 |
| WO | WO 2013/115187 A1 | 8/2013 |
| WO | WO 2014/103845 A1 | 7/2014 |
| WO | WO 2015/068807 A1 | 5/2015 |
| WO | WO 2015/133630 A1 | 9/2015 |
| WO | WO 2015/198986 A1 | 12/2015 |
| WO | WO 2016/002887 A1 | 1/2016 |

OTHER PUBLICATIONS

International Search Report dated Sep. 5, 2017 in PCT/JP2017/024236, filed on Jun. 30, 2017 (with English Translation).

* cited by examiner

ETHYLENE-TETRAFLUOROETHYLENE COPOLYMER FILM AND METHOD FOR PRODUCING SAME

TECHNICAL FIELD

The present invention relates to an ethylene-tetrafluoroethylene copolymer (hereinafter referred to also as "ETFE") film and a method for producing the same.

BACKGROUND ART

A semiconductor chip is usually accommodated (sealed) in a container called a package for blocking and protection from the outside air, and mounted on a substrate as a semiconductor device. For the package, a curable resin such as epoxy resin is used.

As a method for producing a semiconductor device, a method by a transfer molding method or compression molding method is known, wherein a semiconductor chip or the like, is placed so as to be positioned at a predetermined location in a mold and a curable resin is filled in the mold and cured.

In the above transfer molding method or compression molding method, in order to facilitate release of the package from the mold, a release film may be disposed on the surface of the mold to be in contact with the curable resin.

As the release film, from the viewpoint of its releasability and mold followability being good, a fluororesin film, in particular an ETFE film, is commonly used.

In recent years, there has been an increasing number of NAND-type flash memory with a large capacity. In this structure, a plurality of memory chips are stacked in multiple stages, whereby the total thickness becomes large. Therefore, the cavity of the mold for producing the same is also becoming deep.

When a release film is used by a compression molding method, in the operating mechanism of the compression molding, the mold release film disposed on the surface of the mold is once stretched and subsequently retracted, whereby there is such a problem that wrinkles are likely to be formed in the release film. The problem of wrinkles becomes pronounced as the mold cavity becomes deeper, and in some cases, there may be a phenomenon such that the wrinkled release film bites into the curable resin and becomes to be hardly released.

Against this problem, Patent Document 1 proposes a compression molding apparatus provided with a compression molding mold having a specific structure, in order to remove wrinkles formed in the film.

Patent Document 2 proposes, as a release film to be used in the production of semiconductor devices, a release film, of which the tensile modulus at 132° C. is from 10 to 24 MPa, and the maximum value of the peel strength is at most 0.8N/25 mm.

On the other hand, as a method for producing a fluororesin film, a melt molding method is commonly employed, wherein a molten fluororesin is extruded from a die, then cooled and solidified.

Patent Document 3 proposes a method for producing a fluororesin film, wherein at the time of obtaining a flat film by contacting a molten fluororesin extruded from a T-die with a cooling roll to let it be cooled and solidified, the surface temperature of the cooling roll is set to be from 80 to 140° C., and hot air of from 50 to 160° C. is blown to the film on this cooling roll. It is said that according to this method, it is possible to produce a fluororesin film excellent in optical properties and flatness, without impairing the excellent properties of the fluororesin.

Patent Document 4 proposes a process for producing a film comprising a melting step of heating a copolymer containing ethylene units, tetrafluoroethylene units and specific (fluoroalkyl)ethylene units, a molding step of molding the molten copolymer into a film, a cooling step of quenching the obtained film by contacting it with a cooling roll of at most the temperature higher by 10° C. than the glass transition temperature of the film, while maintaining the crystallization temperature of the copolymer, and a recovery step of recovering the quenched film. It is said that according to this process, it is possible to produce a film, of which the crystallinity obtainable by the X-ray diffraction measurement is at most 68%, and the film is excellent in transparency and heat resistance.

In Patent Documents 3 and 4, no study has been made to use the obtainable fluororesin film as a release film in the above-mentioned compression molding method.

PRIOR ART DOCUMENTS

Patent Documents

Patent Document 1: JP-A-2013-180461
Patent Document 2: WO2013/115187
Patent Document 3: JP-A-S61-27231
Patent Document 4: JP-A-2014-141646

DISCLOSURE OF INVENTION

Technical Problem

With the compression molding apparatus described in Patent Document 1, the device structure tends to be redundantly long, and as found by the present inventors, the effect to remove wrinkles was not sufficient.

With the release film described in Patent Document 2, as found by the present inventors, the effect to prevent formation of wrinkles during the compression molding was not sufficient.

The present inventors used a fluororesin film obtainable by each of the methods described in Patent Documents 3 and 4, as a release film in the above-mentioned compression molding method, whereby the effect to prevent formation of wrinkles during the compression molding was not sufficient.

An object of the present invention is to provide an ETFE film whereby wrinkles are less likely to be formed when stretched and retracted, and a method for its production.

Solution to Problem

The present invention provides an ETFE film and a method for its production having constructions of the following [1] to [14].

[1] A film being an ethylene-tetrafluoroethylene copolymer film, characterized in that the crystallinity obtainable by the following formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17°$ in the diffraction intensity curve obtainable by the X-ray diffraction method, is from 55 to 70%, and the proportion of the quasi-crystal layer obtainable by the following formula (2) is from 10 to 20%, $$\text{Crystallinity (\%)} = (S_{19}+S_{20})/(S_{17}+S_{19}+S_{20}) \times 100 \quad (1)$$

$$\text{Proportion of quasi-crystal layer (\%)} = S_{20}/(S_{17}+S_{19}+S_{20}) \times 100 \quad (2)$$

[2] A film characterized by being made of a mixture of the following ETFE (A) and the following ETFE (B) in a mass ratio of from 80/20 to 95/5, ETFE (A): an ethylene-tetrafluoroethylene copolymer having tetrafluoroethylene units, ethylene units and third units based on a monomer other than tetrafluoroethylene and ethylene, wherein the molar ratio of the tetrafluoroethylene units to the ethylene units is from 45/55 to 65/35, and the proportion of the third units to the total of the tetrafluoroethylene units and the ethylene units is from 0.5 to 1.5 mol %, ETFE (B): an ethylene-tetrafluoroethylene copolymer having tetrafluoroethylene units, ethylene units and third units based on a monomer other than tetrafluoroethylene and ethylene, wherein the molar ratio of the tetrafluoroethylene units to the ethylene units is from 45/55 to 65/35, and the proportion of the third units to the total of the tetrafluoroethylene units and the ethylene units is from 3.5 to 6 mol %.

[3] The film according to [2], wherein the crystallinity obtainable by the following formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17°$ in the diffraction intensity curve obtainable by the X-ray diffraction method, is from 55 to 70%, and the proportion of the quasi-crystal layer obtainable by the following formula (2) is from 10 to 20%, $$\text{Crystallinity (\%)} = (S_{19}+S_{20})/(S_{17}+S_{19}+S_{20}) \times 100 \quad (1)$$

$$\text{Proportion of quasi-crystal layer (\%)} = S_{20}/(S_{17}+S_{19}+S_{20}) \times 100 \quad (2)$$

[4] The film according to any one of [1] to [3], which is a release film for producing a semiconductor device.

[5] A method for producing a film, characterized by extruding a melt of an ethylene-tetrafluoroethylene copolymer from an extrusion molding apparatus in the form of a film, contacting the film to a first cooling means so that the surface temperature be more than the crystallization temperature of the copolymer and less than the melting point of the copolymer for a predetermined time to obtain the primary cooled product, then peeling the primary cooled product from the first cooling means, and cooling it, within a predetermined time from the peeling point of time, by a second cooling means to a temperature of at least (the melting point of the copolymer—120° C.) and at most (the melting point of the copolymer—80° C.).

[6] The method for producing a film according to [5], wherein the period for contacting the film to the first cooling means, is from 3 to 20 seconds.

[7] The method for producing a film according to [5] or [6], wherein the time for cooling to the above temperature by the second cooling means from the point of time peeled from the first cooling means is within one second.

[8] The method for producing a film according to any one of [5] to [7], wherein the ethylene-tetrafluoroethylene copolymer is a copolymer having tetrafluoroethylene units, ethylene units and third units based on a monomer other than tetrafluoroethylene and ethylene.

[9] The method for producing a film according to any one of [5] to [8], wherein the cooling of the primary cooled product is conducted by contact with a cooling roll, air knife or immersion in water.

[10] The method for producing a film according to any one of [5] to [9], which is to produce the film as defined in [1].

[11] A method for producing an ethylene-tetrafluoroethylene copolymer film, characterized by extruding a molten mixture of the following ETFE (A) and the following ETFE (B) in a mass ratio of from 80/20 to 95/5 from an extrusion molding apparatus in the form of a film, followed by cooling, ETFE (A): an ethylene-tetrafluoroethylene copolymer having tetrafluoroethylene units, ethylene units and third units based on a monomer other than tetrafluoroethylene and ethylene, wherein the molar ratio of the tetrafluoroethylene units to the ethylene units is from 45/55 to 65/35, and the proportion of the third units to the total of the tetrafluoroethylene units and the ethylene units is from 0.5 to 1.5 mol %, ETFE (B): an ethylene-tetrafluoroethylene copolymer having tetrafluoroethylene units, ethylene units and third unit based on a monomer other than tetrafluoroethylene and ethylene, wherein the molar ratio of the tetrafluoroethylene units to the ethylene units is from 45/55 to 65/35, and the proportion of the third units to the total of the tetrafluoroethylene units and the ethylene units is from 3.5 to 6 mol %.

[12] The method for producing a film according to [11], which is to produce the film as defined in [1].

[13] The method for producing a film according to [11], which is to produce the film as defined in [2] or [3].

[14] The method for producing a film according to any one of [5] to [13], wherein the film is a release film for producing a semiconductor device.

Advantageous Effects of Invention

The ETFE film of the present invention is less likely to wrinkle when stretched and retracted.

According to the method for producing an ETFE film of the present invention, it is possible to produce an ETFE film which is less likely to wrinkle when stretched and retracted.

DESCRIPTION OF EMBODIMENTS

Figure 1:
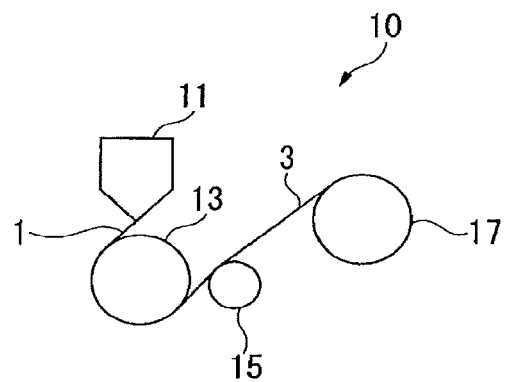
FIG. 1 is a schematic diagram for illustrating a first embodiment of the production method (i) of the present invention.

Meanings of terms in the present specification are as follows.

A "unit" is a general term for a group of atoms, which is directly formed by polymerization of a monomer and derived from one molecule of the monomer, and a group of atoms obtainable by chemically converting a part of such a group of atoms. Further, units based on a specific monomer may be represented by attaching "units" to the monomer name. It should be noted that, in the following, tetrafluoroethylene may be referred to as "TFE", tetrafluoroethylene units may be referred to also as "TFE units", and ethylene units may be referred to also as "E units".

"ETFE" (ethylene-tetrafluoroethylene copolymer) is a copolymer comprising TFE units and E units.

An "ETFE film" is a molded product obtained by molding ETFE into a film-form or sheet-form (collectively referred to also as a "film-form, etc."). The ETFE film may contain additives.

"Stretchability" includes both of being less likely to be ruptured when stretched under a load, and having little residual displacement after removal of the load.

The "arithmetic average roughness Ra" is a value measured in accordance with JIS B0601: 2013 (ISO 4287: 1997, Amd.1: 2009). The standard length lr (cut-off value λc) for the roughness curve is 0.8 mm.

The "melt flow rate" of ETFE is a value measured under a load 49N at 297° C. in accordance with ASTM D3159. The "melt flow rate" is referred to also as "MFR". MFR is an index for the molecular weight, and the higher the MFR, the smaller the molecular weight.

The ETFE film in the present invention is an ETFE film, of which the crystallinity obtainable by the following formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17°$ in the diffraction intensity curve obtainable by measuring by the X-ray diffraction method is from 55 to 70%, and the proportion of the quasi-crystal layer obtainable by the following formula (2) is from 10 to 20% (hereinafter, an ETFE film having such specific crystallinity and proportion of quasi-crystal layer will be referred to also as "ETFE film (I)").

Crystallinity (%)=$(S_{19}+S_{20})/(S_{17}+S_{19}+S_{20})\times 100$     (1)

Proportion of quasi-crystal layer (%)=$S_{20}/(S_{17}+S_{19}+S_{20})\times 100$     (2)

As means for obtaining ETFE film (I), the following two means are preferred, and such two means may be used in combination. However, means for obtaining ETFE film (I) are not limited thereto. Further, the following two means are not ones limited as a means for obtaining ETFE film (I).

The first means is a method in which ETFE constituting the ETFE film is composed of the following ETFE (A) and ETFE (B), wherein the mass ratio of the ETFE (A) to the ETFE (B) is from 80/20 to 95/5.

ETFE (A): a copolymer having TFE units and E units, and third units based on a monomer other than TFE and ethylene, wherein the molar ratio of TFE units to E units is from 45/55 to 65/35, and the proportion of the third units to the total of TFE units and E units is from 0.5 to 1.5 mol %.

ETFE (B): a copolymer having TFE units and E units, and third units based on a monomer other than TFE and ethylene, wherein the molar ratio of TFE units to E units is from 45/55 to 65/35, and the proportion of the third units to the total of TFE units and E units is from 3.5 to 6 mol %.

And, the second means is a method for producing a film characterized by extruding molten ETFE from an extrusion molding apparatus in the form of a film, contacting the film to a first cooling means so that the surface temperature be more than the crystallization temperature of the ETFE (hereinafter, the crystallization temperature of ETFE may be referred to also as "Tc") and less than the melting point of the ETFE (hereinafter the melting point of ETFE may be referred to also as "Tm") for a predetermined time to obtain the primary cooled product, then peeling the primary cooled product from the first cooling means, and cooling it, within a predetermined time from the peeling point of time, by a second cooling means to a temperature of at least (Tm—120° C.) and at most (Tm—80° C.).

Tc of ETFE is obtained from the heat radiation peak when ETFE is heated at 10° C./min. to 350° C. in an air atmosphere and cooled at 10° C./min. to 200° C., by using a scanning differential thermal analyzer (manufactured by SII NanoTechnology, Inc., DSC220CU).

Tm of ETFE is obtained from the endothermic peak when ETFE is heated at 10° C./min. to 350° C. in an air atmosphere and cooled at 10° C./min. to 200° C., by using a scanning differential thermal analyzer (manufactured by SII NanoTechnology, Inc., DSC220CU).

In the following, they will be described, respectively.

[ETFE Film (I)]

In the diffraction intensity curve, the peak in the vicinity of $2\theta=20°$ is a peak derived from the quasi-crystal layer of ETFE, the peak in the vicinity of $2\theta=19°$ is a peak derived from the complete crystal layer of ETFE, the peak in the vicinity of $2\theta=17°$ is a peak derived from the amorphous layer of ETFE.

Therefore, the crystallinity (%) obtainable by the above formula (1) represents the ratio of the total of the quasi-crystal layer and the complete crystal layer to the total of the quasi-crystal layer, the complete crystal layer and the amorphous layer of ETFE in the ETFE film. The proportion of the quasi-crystal layer obtainable by the above formula (2) represents the proportion of the quasi-crystal layer to the total of the quasi-crystal layer, the complete crystal layer and the amorphous layer.

The above crystallinity is from 55 to 70%, preferably from 60 to 70%. When the crystallinity is within the above range, the ETFE film is less likely to be ruptured when it is stretched. If the crystallinity is less than 55%, the strength of the ETFE film becomes low so that it tends to be easily ruptured. If the crystallinity exceeds 70%, the ETFE film tends to be brittle and is likely to be easily ruptured.

The proportion of the quasi-crystal layer is from 10 to 20%, preferably from 10 to 17%. When the proportion of the quasi-crystal layer is at least 10%, the ETFE film will be excellent in stretchability, whereby a residual displacement after stretching will be little. Therefore, for example, in the case of producing a semiconductor device by a compression molding method by using the ETFE film as a release film, such wrinkles that make the mold release difficult after sealing by the curable resin, are less likely to occur. When the proportion of the quasi-crystal layer is at most 20%, the ETFE film will be excellent in dimensional stability.

The measurement by the X-ray diffraction method of the ETFE film is conducted under the following conditions, using a powder X-ray diffraction apparatus, by pasting a sample made by cutting a part of the ETFE film, to a quartz plate for the sample, and fixing it to a sample stand.

(Measurement Conditions)

Measurement apparatus: manufactured by Bruker Co., D2 PHASER

Measuring method: $2\theta/\theta$ method

Measurement range: $2\theta=10$ to $30°$

X-ray intensity: 30 kV, 10 mA

X-ray source: CuKα ray

Analysis software: manufactured by Bruker Co., TOPAS Ver. 4.2

Measurement temperature: room temperature (20 to 25° C.)

With respect to the obtained diffraction intensity curve, curve fitting is carried out by using an analysis software. Using, as the function, Pearson vii function, the fitting is carries out so that the difference between the fitting curve and the actual curve will be at most 10%. By using a peak separation method, the peak position of the amorphous portion is set to be 2θ=17.268°, and with respect to the two crystal peaks, by setting 20° and 19° as starting points, optimization of the curve is automatically detected. The half width of the peak was automatically optimized. There are two crystal peaks, and the area ratio of the respective peaks is obtained. Based on the obtained area ratio, the crystallinity and the proportion of the quasi-crystal layer are calculated in accordance with the above formulae.

In the diffraction intensity curve, the peak in the vicinity of 2θ=20° is usually observed in the range of 2θ=20°±0.4, the peak in the vicinity of 2θ=19° is usually observed in the range of 2θ=19°±0.4, and the peak in the vicinity of 2θ=17° is usually observed in the range of 2θ=17°±0.4.

ETFE to constitute ETFE film (I) is preferably a polymer comprising TFE units, E units, and third units based on a monomer other than TFE and ethylene (hereinafter referred to also as a "third monomer"). By the type and content of the third units, it is possible to adjust the crystallinity of ETFE. For example, when the third units are made to be units based on a monomer having fluorine atoms, the crystallinity will be lowered, and the tensile strength and elongation at a high temperature (especially at about 180° C.) will be improved.

The third monomer may be a monomer having fluorine atoms, or a monomer having no fluorine atom.

The monomer having fluorine atoms may be a fluoroolefin having 2 or 3 carbon atoms, a fluoroalkyl ethylene represented by the formula $X(CF_2)_nCY=CH_2$ (wherein X and Y are each independently a hydrogen atom or a fluorine atom, and n is an integer of from 2 to 8), a fluorovinyl ether, a fluorinated monomer having an alicyclic structure, etc.

Specific examples of the above fluoroolefin include fluoroethylene (trifluoroethylene, vinylidene fluoride, vinyl fluoride, chlorotrifluoroethylene, etc.), and fluoropropylene (hexafluoropropylene (hereinafter referred to also as "HFP"), 2-hydropentafluoropropylene, etc.).

As the above fluoroalkyl ethylene, a monomer wherein n is from 2 to 6, is preferred, and a monomer wherein n is from 2 to 4 is more preferred. Further, a monomer wherein X is a fluorine atom and Y is a hydrogen atom, i.e. a (perfluoroalkyl) ethylene, is particularly preferred.

Specific examples of the above fluoroalkyl ethylene include $CH_2=CHCF_2CF_3$, $CH_2=CHCF_2CF_2CF_3$ ((perfluorobutyl)ethylene, hereinafter referred to also as "PFBE"), $CH_2=CFCF_2CF_2CF_3$, $CH_2=CFCF_2CF_2CF_2H$, and $CH_2=CFCF_2CF_2CF_2CF_2H$.

Specific examples of the above fluorovinyl ether include $CF_2=CFOCF_3$, $CF_2=CFOCF_2CF_3$, $CF_2=CFO(CF_2)_2CF_3$ (perfluoro(propyl vinyl ether), hereinafter referred to also as "PPVE"), $CF_2=CFOCF_2CF(CF_3)O(CF_2)_2CF_3$, $CF_2=CFO(CF_2)_3O(CF_2)_2CF_3$, $CF_2=CFO(CF_2CF(CF_3)O)_2(CF_2)_2CF_3$, $CF_2=CFOCF_2CF(CF_3)O(CF_2)_2CF_3$, $CF_2=CFOCF_2CF=CF_2$, and $CF_2=CFO(CF_2)_2CF=CF_2$. Here, among the above, a monomer being a diene is a cyclo-polymerizable monomer.

Further, the above fluorovinyl ether may have a functional group.

Specific examples of the above fluorovinyl ether having a functional group include $CF_2=CFO(CF_2)_3CO_2CH_3$, $CF_2=CFOCF_2CF(CF_3)O(CF_2)_3CO_2CH_3$, and $CF_2=CFOCF_2CF(CF_3)O(CF_2)_2SO_2F$.

Specific examples of the above fluorinated monomer having an alicyclic structure include perfluoro(2,2-dimethyl-1,3-dioxole), 2,2,4-trifluoro-5-trifluoromethoxy-1,3-dioxole, and perfluoro(2-methylene-4-methyl-1,3-dioxolane).

The monomer having no fluorine atom may be an olefin, a vinyl ester, a vinyl ether, an unsaturated acid anhydride, etc.

Specific examples of the above olefin include propylene, and isobutene.

Specific examples of the above vinyl ester compound include vinyl acetate.

Specific examples of the above vinyl ether compound include ethyl vinyl ether, butyl vinyl ether, cyclohexyl vinyl ether, and hydroxybutyl vinyl ether.

Specific examples of the above unsaturated acid anhydride include maleic anhydride, itaconic anhydride, citraconic anhydride, and himic anhydride (5-norbornene-2,3-dicarboxylic acid anhydride).

As the third monomer, one type may be used alone, or two or more types may be used in combination.

As the third monomer, from such a viewpoint that it is easy to adjust the crystallinity, preferred is a fluoroalkyl ethylene represented by $X(CF_2)_nCY=CH_2$, HFP, PPVE, or vinyl acetate; from the viewpoint of excellent tensile strength and elongation at a high temperature (especially at about 180° C.), more preferred is HFP, PPVE, $CF_3CF_2CH=CH_2$, or PFBE; and particularly preferred is PFBE. That is, as ETFE, particularly preferred is a copolymer having TFE units, E units and PFBE units.

In ETFE (I), the molar ratio of TFE units to E units (TFE units/E units) is, from the viewpoint of excellent heat resistance and mechanical strength of the ETFE, from 45/55 to 65/35, preferably from 50/50 to 65/35, particularly preferably from 50/50 to 60/40.

In ETFE (I), the proportion of the third units to the total of TFE units and E units is, from the viewpoint of excellent heat resistance and mechanical strength of the ETFE, preferably from 0.5 to 10.0 mol %, more preferably from 1.0 to 8.0 mol %, particularly preferably from 1.2 to 4.0 mol %.

In the total of all units in the ETFE, the total of TFE units, E units and the third units is 100 mol %.

ETFE film (I) may be one composed solely of resin components, or may further contain other components. Specific examples of such other components include various additives such as a lubricant, an antioxidant, an antistatic agent, a plasticizer, a mold release agent, etc. One of these additives may be used alone, or two or more of them may be used in combination.

In a case where ETFE film (I) is used as a release film for the production of a semiconductor device, ETFE film (I) preferably contains no other components, so that it is less likely to contaminate the mold or package.

ETFE film (I) is preferably a single layer film.

The surface of ETFE film (I) may be smooth or may have irregularities formed, or one surface may be smooth and the other surface may have irregularities formed.

In the case of having irregularities formed, the surface shape may be a shape wherein among the pluralities of protrusions and recesses, some or all of them are randomly distributed, or a shape wherein among the pluralities of protrusions and recesses, some or all of them are regularly arranged. The shapes and sizes of the protrusions and recesses may be the same or different.

The protrusions may be elongated ridges extending on the surface of a release film, scattered projections, etc., and the recesses may be elongated grooves extending on the surface of a release film, scattered holes, etc.

The shapes of the ridges or grooves may be lines, curves, bent shapes, etc. On the surface of a release film, a plurality of ridges or grooves may be present in parallel to form stripes. Of ridges or grooves, the cross-sectional shape in a direction perpendicular to the longitudinal direction, may be polygonal such as triangular (V-shaped), semicircular, etc.

The shape of the projections or holes may be polygonal pyramid, such as triangular pyramid shaped, tetragonal pyramid shaped, hexagonal pyramid shaped, etc., conical, hemispherical, polyhedral, other various indefinite shapes, etc.

In a case where ETFE film (I) is to be used as a release film for the production of a semiconductor device, the arithmetic average roughness Ra of the surface of ETFE films (I) to be in contact with the mold at the time of forming a resin sealing portion, is preferably from 0.2 to 2.5 μm, particularly preferably from 0.2 to 2.0 μm. When the arithmetic average roughness Ra is at least the lower limit value in the above range, the above surface and the mold are less likely to cause blocking, whereby wrinkles due to the blocking is less likely to occur. Further, releasability from the mold of the ETFE film (I) will be more excellent. When the arithmetic average roughness Ra is at most 2.5 μm, pin holes are less likely to be formed in the release film.

The thickness of ETFE film (I) is preferably from 50 to 100 μm, particularly preferably from 50 to 75 μm. When the thickness of ETFE film (I) is at least the lower limit value in the above range, handling of ETFE film (I) (e.g. handling by roll-to-roll) will be easy, and at the time of placing ETFE film (I) to cover the mold cavity while pulling it, wrinkles are less likely to occur. When the thickness of ETFE film (I) is at most 100 μm, ETFE film (I) is easily deformable and will be excellent in mold followability.

When the crystallinity and the proportion of the quasi-crystal layer are, respectively, in the above-mentioned ranges, ETFE film (I) will be excellent in stretchability and less likely to be broken when stretched under a load, and further the residual displacement after removing the load is little. Since the residual displacement is little, wrinkles are less likely to occur when stretched and retracted. For example in the production of a semiconductor device by a compression molding method, at the time of placing ETFE film (I) as a release film in a mold, followed by sealing by a curable resin, wrinkles of the release film contacted to the mold will be reduced as compared with the conventional practice. For example, it is possible to prevent such biting in the package of the release film as to make it unreleasable.

In ETFE film (I), the proportion of crystal layer (the crystallinity) is high, and the proportion of the quasi-crystal layer in the crystal layer is high, as compared with a conventional ETFE film which is used as a release film. The quasi-crystal layer has a good balance of rigidity and flexibility and thus serves as a pseudo-crosslinked structure, whereby it is considered that the stretchability of the film becomes high.

Further, the residual displacement is less, whereby at the time of preparing, as a building structure, a so-called air film structure having air put between two films bonded to each other, the films are less likely to be broken even when they are inflated by putting air between them, and when air is released, the films will shrink, and thus, they can be used repeatedly.

Further, since the residual displacement is less, when used as a film for an agricultural house, it is easy to prevent such a phenomenon that the film will be stretched by water pooled on the film by rain, etc., and, and when the water is removed, it quickly returns to the original tension.

The present invention is also an ETFE film obtained by using a mixture ETFE (A) and ETFE (B) combined in the above-mentioned mass ratio. Such an ETFE film will be hereinafter referred to as "ETFE film (II)". In ETFE film (II), wrinkles are less likely to be formed when it is stretched and retracted.

In ETFE film (II), ETFE (B) is less likely to be crystallized than ETFE (A), since the content of the third units is large. At the time of crystallization of ETFE (A), ETFE (B) intrudes to inhibit the crystallization of ETFE (A) thereby to inhibit the growth of the complete crystal layer and increase the proportion of the quasi-crystal layer. Thus, it is considered that the obtainable ETFE film will be a film wherein the proportion of the crystal layer (crystallinity) becomes high and further the proportion of quasi-crystal layer in the crystal layer becomes high, whereby wrinkles are less likely to be formed when it is stretched and retracted.

ETFE film (II) preferably has the same crystallinity and proportion of the quasi-crystal layer as ETFE film (I). That is, ETFE film (II) is preferably ETFE film (I). (ETFE (A))

ETFE (A) has TFE units, E units and third units.

As the monomer to form the third units in ETFE (A), the above-mentioned third monomer in ETFE (I) may be mentioned. The third units in ETFE (A) may be composed of two or more types of units. As the third units in ETFE (A), particularly preferred are (perfluoroalkyl) ethylene units.

In ETFE (A), the molar ratio of TFE units to E units (TFE units/E units) is, from the viewpoint of excellent heat resistance and mechanical strength of ETFE, from 45/55 to 65/35, preferably from 50/50 to 65/35, particularly preferably from 50/50 to 60/40.

In ETFE (A), the proportion of the third units to the total of TFE units and E units is from 0.5 to 1.5 mol %, preferably from 0.8 to 1.5 mol %, particularly preferably from 1.0 to 1.5 mol %. When the proportion of the third units is at most 1.5 mol %, ETFE (A) tends to be easily crystallized, and a complete crystal layer tends to be easily formed. Therefore, the crystallinity of the film containing the same can be made to be high, for example, to be at least 55%. Further, the film will also be excellent in heat resistance. When the proportion of the third units is at least 0.5 mol %, the film will also be excellent in mechanical strength.

In the total of all units in ETFE (A), the total of TFE units, E units and third units is 100 mol %.

MFR of ETFE (A) is, from the viewpoint of improvement in moldability of ETFE and excellent mechanical strength of the ETFE film, preferably from 2 to 40 g/10 min., more preferably from 5 to 30 g/10 min., particularly preferably from 10 to 20 g/10 min. (ETFE (B))

ETFE (B) has TFE units, E units and third units.

As the monomer to form the third units in ETFE (B), the above-mentioned third monomer in ETFE (I) may be mentioned. The third units in ETFE (B) may be composed of two or more types of units. Further, the third units in ETFE (B) may be the same or different as the third units in ETFE (A). As the third units in ETFE (B), particularly preferred are (perfluoroalkyl)ethylene units.

The molar ratio of TFE units to E units in ETFE (B) is, like in ETFE (A), from 45/55 to 65/35, and the preferred ranges are also the same as in ETFE (A).

In ETFE (B), the proportion of third units to the total of TFE units and E units is from 3.5 to 6 mol %, preferably from 3.5 to 5.5 mol %, particularly preferably from 3.5 to 4.5 mol %. When the proportion of third units is at least 3.5 mol %, ETFE (B) tends to be hardly crystallized. Therefore, at the time of obtaining a film by molding ETFE (B) together with ETFE (A), crystallization of ETFE (A) will be inhibited by ETFE (B), whereby the growth of the complete crystal layer will be suppressed, and the quasi-crystal layer will grow. Thus, it is possible to obtain, for example, an ETFE film wherein the proportion of the quasi-crystal layer is at least 10% and the crystallinity is at most 70%. When the proportion of third units is at most 5.5 mol %, the heat resistance of the ETFE film will be excellent.

In the total of all units in ETFE (B), the total of TFE units, E units and third units is 100 mol %.

The preferred range of MFR of ETFE (B) is the same as of ETFE (A).

(Mass Ratio of ETFE (A) to ETFE (B))

The mass ratio of ETFE (A) to ETFE (B) (ETFE (A)/ ETFE (B)) is from 80/20 to 95/5, preferably from 85/15 to 95/5, particularly preferably from 90/10 to 95/5.

When ETFE (A) is at least 80 parts by mass to 100 parts by mass in total of ETFE (A) and ETFE (B), at the time of obtaining a film by molding a mixture of ETFE (A) and ETFE (B), the crystallinity will be high and becomes, for example, to be at least 55%.

Further, when ETFE (B) is at least 5 parts by mass to 100 parts by mass in total of ETFE (A) and ETFE (B), at the time of obtaining a film by molding a mixture of ETFE (A) and ETFE (B), crystallization of ETFE (A) will be inhibited by ETFE (B), growth of the complete crystal layer will be suppressed, and the quasi-crystal layer will be grown. Thus, it is possible to obtain, for example, an ETFE film wherein the proportion of the quasi-crystal layer is from 10 to 20%, and the crystallinity is at most 70%.

If ETFE (B) exceeds 20 parts by mass to 100 parts by mass in total of ETFE (A) and ETFE (B), it tends to be difficult for ETFE (A) and ETFE (B) to be compatibilized, crystallization of ETFE (A) tends to be not sufficiently inhibited by ETFE (B), and there is a possibility that the quasi-crystal layer will not grow sufficiently.

ETFE film (II) may be composed solely of ETFE (A) and ETFE (B) or may further contains, in addition to ETFE (A) and ETFE (B), components other than ETFE. In a case where the ETFE film is used as a release film for the production of a semiconductor device, with a view to being less likely to contaminate the mold or package, it is preferred not to contain other components.

ETFE film (II) is preferably a single layer film.

The surface of ETFE film (II) may be smooth or may have irregularities formed, or one surface may be smooth while the other surface may have irregularities formed.

With a view to being excellent in releasability when ETFE film (II) is used as a release film for the production of a semiconductor device, as described above, it is preferred that irregularities are formed.

In a case where ETFE film (II) is used as a release film for the production of a semiconductor device, the preferred range of the arithmetic average roughness Ra of the surface of ETFE film (II), in contact with the mold at the time of forming the resin sealing portion, is the same as ETFE film (I).

The preferred range in thickness of ETFE film (II) is the same as ETFE film (I).

(Method for Producing ETFE Film (II))

ETFE film (II) can be produced by extruding a molten mixture of ETFE (A) and ETFE (B) in the above-mentioned mass ratio into a film-form from an extruder, followed by cooling.

Such production of ETFE film (II) can be carried out by using, for example, a production apparatus provided with an extrusion molding apparatus, a cooling means such as cooling rolls and a winding roll.

The extrusion molding apparatus is used to melt ETFE and extrude it continuously from a die at an optional extrusion rate. The die is to shape the molten ETFE into a film, etc., and a flat die (T-die), etc. may be used. The extrusion molding apparatus is not particularly limited, and it is possible to use a known extrusion device such as a single-screw extruder or a twin-screw extruder.

ETFE (A) and ETFE (B) to be supplied to the extrusion molding apparatus, may be a mixture having previously melt-mixed, or ETFE (A) and ETFE (B) not previously mixed may be supplied and melt-mixed in the extrusion molding apparatus. Preferably, ETFE (A) and the ETFE (B) are previously melt-mixed and pelletized, and the obtained pellets are supplied to an extrusion molding apparatus to produce a film.

As the cooling roll, one capable of adjusting the surface temperature is preferably used. As described later, it is also possible to conduct cooling stepwise by using two or more cooling rolls.

The melting temperature and cooling temperature may be optionally determined.

To ETFE (A), ETFE (B) or a mixture thereof to be supplied to the extrusion molding apparatus, additives other than ETFE may be preliminarily added so that such other additives may together be fed to the extrusion molding apparatus.

However, the method for producing ETFE film (II) is not limited thereto, and except that as ETFE, ETFE (A) and ETFE (B) are used in the above-mentioned ratio, the film may be prepared by a known method.

The present invention further is a method for producing an ETFE film by two-stage cooling, whereby it is possible to produce a film wherein wrinkles are less likely to be formed when stretched and retracted. This production method is a preferred method as the method for producing ETFE film (I) but is not limited thereto, and it is also suitable as a method for producing ETFE film (II) or other ETFE film.

Hereinafter, the production method of an ETFE film by this two-stage cooling will be referred to also as "production method (i)".

In production method (i), ETFE used as raw material is not particularly limited.

In ETFE, the molar ratio of TFE units to E units (TFE units/E units) is, from the viewpoint of excellent heat resistance and mechanical strength of ETFE, preferably from 45/55 to 65/35, more preferably from 50/50 to 65/35, particularly preferably from 50/50 to 60/40.

In ETFE, the proportion of third units to the total of TFE units and E units is, from the viewpoint of excellent heat resistance and mechanical strength of ETFE, preferably from 0.5 to 10.0 mol %, more preferably from 1.0 to 8.0 mol %, particularly preferably from 1.2 to 4.0 mol %.

In the total of all units in ETFE, the total of TFE units, E units and third units is 100 mol %.

ETFE to be used as raw material may be one type, or two or more types. For example, like the above-mentioned specific mixture comprising ETFE (A) and ETFE (B), two or more types of copolymers may be used as mixed. In a case where ETFE is composed of two or more types, in the total of all units in ETFE, it is preferred that the proportion of third units to the total of TFE units and E units is in the above-mentioned range on average.

In the case of using a mixture of two types as ETFE, Tc is a value determined by the following formula (3), and Tm is a value determined by the following formula (4).

$$Tc(°\text{ C.})=[Tc\text{ of ETFE}(A))\times(\text{mass proportion (\%) of ETFE}(A)\text{ in said ETFE})/100]+[Tc\text{ of}(ETFE(B))\times(\text{mass proportion (\%) of ETFE}(B)\text{ in said ETFE}/100)] \quad (3)$$

$$Tm(°\text{ C.})=[Tm\text{ of ETFE}(A)\times(\text{mass proportion (\%) of ETFE}(A)\text{ in said ETFE})/100]+[(Tm\text{ of ETFE}(B))\times(\text{mass proportion (\%) of ETFE}(B)\text{ in said ETFE}/100)] \quad (4)$$

To ETFE to be supplied to the extrusion molding apparatus, additives other than ETFE may preliminarily be added, or additives may be supplied together with ETFE to the extrusion molding apparatus.

In the production method (i) of the present invention, as the first cooling means, for example, a roll (cooling roll) capable of adjusting the surface temperature may be used. As the cooling means for the primary cooled product, i.e. as the second cooling means, for example, a cooling roll, air knife, immersion in water (water tank, etc.) may be used. Hereinafter, cases will be described wherein as the first cooling means, a cooling roll (hereinafter referred to as "first cooling roll") is used, and as the second cooling means a cooling roll (first embodiment), an air knife (second embodiment) or a water tank (third embodiment) is used.

First Embodiment

A production apparatus 10 in FIG. 1 comprises a die 11 in an extrusion molding apparatus (not shown), a first cooling roll 13 (first cooling means), a cooling roll 15 (hereinafter referred to as a "second cooling roll") as a second cooling means and a winding roll 17.

The die 11 is one to shape the molten ETFE into a film-form, etc., and may be a flat die (T-die), etc.

The extrusion molding apparatus having the die 11 is used to melt ETFE and extrude it continuously from the die 11 at an optional extrusion rate. The extrusion molding apparatus is not particularly limited, and it is possible to employ a known extrusion device such as a single-screw extruder or a twin-screw extruder.

As the first cooling roll 13, one capable of adjusting the surface temperature is used. As the first cooling roll 13, a known one may be used, and, for example, a roll may be mentioned which is provided with an inner cylinder to be attached to the rotary shaft, and an outer cylinder disposed outside the inner cylinder, and which distributes or maintains a heat medium (coolant) between the inner cylinder and the outer cylinder.

As the second cooling roll 15, the same one as the first cooling roll 13 may be mentioned.

In the production apparatus 10, an ETFE film is produced by the following procedure.

ETFE is supplied to the extrusion molding apparatus (not shown) and is melted by heating to a temperature of at least Tm of ETFE, and the melt 1 is continuously supplied to the die 11 and extruded in a film-form. The extruded film-form melt 1 is withdrawn to the first cooling roll 13 disposed below the die 11, and moved along the first cooling roll 13 rotated to obtain a primary cooled product.

The obtained primary cooled product was peeled from the first cooling roll 13 and contacted with the second cooling roll and further cooled to obtain an ETFE film 3.

The obtained ETFE film 3 is wound by the winding roll 17 in a roll shape.

In order to melt ETFE, the temperature in the extrusion molding apparatus is at least Tm of the supplied ETFE, preferably at least (Tm of ETFE+10° C.) and at most (Tm of ETFE+150° C.), particularly preferably at least (Tm of ETFE+20° C.) and at most (Tm of ETFE+100° C.). When the temperature in the extrusion molding apparatus is at least Tm of ETFE, a homogeneous melt is obtainable, whereby stable extrusion becomes possible. When the temperature in the extrusion molding apparatus is at most (Tm of ETFE+100° C.), degradation of the material due to thermal decomposition can be prevented.

The preferred range of the temperature in the die 11 is similar.

The air gap between the die 11 and the first cooling roll 13 (the shortest distance between the outlet of the die 11 and the first cooling roll 13) is preferably at most 100 mm, particularly preferably at most 50 mm. When the air gap is at most 100 mm, the time for the melt 1 extruded from the die 11 to contact first with the first cooling roll 13 will be sufficiently short, whereby it is possible to prevent that the temperature of the melt 1 becomes at most Tc of the ETFE before the contact with the first cooling roll 13, whereby the complete crystal layer is less likely to grow, and it will be easy to obtain a low crystallinity ETFE film.

The melt 1 in contact with the first cooling roll 13 is, while moving along the rotating first cooling roll 13, cooled to the surface temperature of the first cooling roll 13 and maintained at that temperature to become a primary cooled product.

The surface temperature of the first cooling roll 13 is more than Tc and less than Tm of ETFE, preferably at least (Tc of ETFE+2° C.) and at most (Tm of ETFE—1° C.), more preferably at least (Tc of ETFE+4° C.) and at most (Tm of ETFE—1° C.).

Further, the state in which the melt 1 and the first cooling roll 13 are in contact, is maintained for a predetermined time (hereinafter, this time will be referred to also as a "retention time"). That is, the retention time is meant for a predetermined time for being held from the time when the melt 1 is first contacted with the first cooling roll 13 until it is peeled from the first cooling roll 13. The retention time may be suitably determined so that the complete crystal layer and quasi-crystal layer are sufficiently grown, and the primary cooled product is less likely to undergo "sagging" i.e. peeling off from the first cooling roll. The retention time is preferably from 3 to 20 seconds, more preferably from 3 to 15 seconds, particularly preferably from 5 to 12 seconds.

When the surface temperature of the first cooling roll 13 is more than Tc and less than Tm of ETFE, and the retention time is at least 3 seconds, it is possible to let the complete crystal layer and quasi-crystal layer be sufficiently grown, and to obtain an ETFE film having a crystallinity of at least 55% and a proportion of the quasi-crystal layer of at least 10%. When the surface temperature of the first cooling roll 13 is more than Tc and less than Tm of ETFE and the retention time is at most 20 seconds, it is possible to obtain an ETFE film having a crystallinity of at most 75% and a proportion of the quasi-crystal layer of at most 20%. Further, "sagging" whereby the primary cooled product is peeled off from the first cooling roll is less likely to occur.

If the surface temperature of the first cooling roll 13 is less than Tc of ETFE in the above range, the quasi-crystal layer will not be sufficiently grown, whereby the proportion of the quasi-crystal layer in the obtainable ETFE film will be low, and the crystallinity may exceed 75%.

The obtained primary cooled product is peeled off from the first cooling roll 13 and cooled by the second cooling roll 15 to obtain an ETFE film 3.

The cooling conditions at that time are set so that the temperature of the obtainable ETFE film 3, i.e. the temperature of the primary cooled product after cooling (hereinafter referred to also as the "cooling temperature"), will be at least (Tm of ETFE —120° C.) and at most (Tm of ETFE—80° C.) within a predetermined time from the time when peeled from the first cooling roll 13. The cooling temperature is preferably at least 150° C. and at most (temperature of the first cooling roll 13—120° C.), more preferably at least 180° C. and at most (temperature of the first cooling roll 13—130° C.).

With respect to the second cooling roll 15, the distance from the first cooling roll 13 and the surface temperature may be set so that it is possible to cool the primary cooled product to at least (Tm of ETFE—120° C.) and at most (Tm of ETFE—80° C.) within 1 second from the peeled point of time.

The surface temperature of the second cooling roll 15 is preferably at least (surface temperature of the first cooling roll 13—180° C.) and at most (surface temperature of the first cooling roll 13—120° C.). When the surface temperature of the second cooling roll 15 is within this range, the temperature of the film immediately after cooling can be made within a proper range, while maintaining the surface temperatures of the first cooling roll 13 and the second cooling roll 15 to be constant.

The time for cooling to the above-mentioned cooling temperature by the second cooling roll 15 from the time when the primary cooled product was peeled from the first cooling roll 13 (hereinafter referred to also as the "cooling time") may suitably be determined so that cooling can be sufficiently done, and the complete crystal layer and quasi-crystalline layer can be fixed. The cooling time is preferably within 1 second, preferably within 0.5 second, particularly preferably within 0.2 second.

By quenching to the above cooling temperature in the above cooling time, the grown complete crystal layer and quasi-crystal layer can be fixed. If the cooling temperature is higher than (Tm of ETFE—80° C.), the cooling will be insufficient, whereby there is a possibility that the quasi-crystal layer will be transferred to the complete crystal layer.

On the other hand, if the cooling temperature is lower than (Tm of ETFE—120° C.), it is rapidly cooled from the molten state, whereby crystallization itself including the complete crystal layer tends to hardly take place, and the crystallinity tends to be too low.

The distance from the position for peeling the primary cooled product of the first cooling roll 13 to the second cooling roll 15 is preferably from 2 to 10 cm, particularly preferably from 2 to 5 cm.

Whether or not the primary cooled product is quenched to the above cooling temperature, can be confirmed by installing a non-contact temperature sensor (M1241-IR14-790-T10SF-C3 Series (wavelength 7.9 μm) manufactured by Shiro Co., Ltd., etc.) at the position where the primary cooled product reaches after the predetermined cooling time (e.g. after 1 second) from being peeled from the first cooling roll 13, and measuring the surface temperature of the ETFE film. In a case where the surface temperature of the ETFE film is at the above cooling temperature, it can be judged to have been quenched.

Second Embodiment

Figure 2:
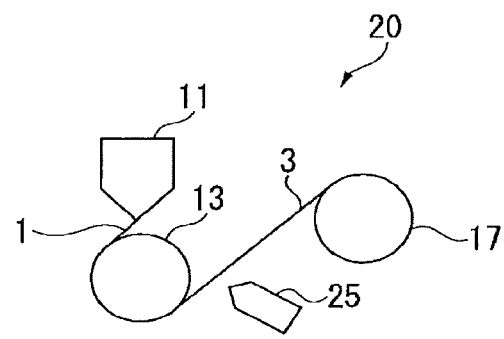
FIG. 2 is a schematic diagram for illustrating a second embodiment of the production method (i).

A production apparatus 20 in FIG. 2 comprises a die 11 in an extrusion molding apparatus (not shown), a first cooling roll 13 (first cooling means), an air knife 25 (second cooling means), and a winding roll 17.

The production apparatus 20 is the same as the production apparatus 10, except that an air knife 25 is provided instead of the second cooling roll 15.

As the air knife 25, a known one may be used.

By the production apparatus 20, an ETFE film is produced by the following procedure.

The primary cooling is carried out in the same manner as described above, and then the obtained primary cooled product is peeled off from the first cooling roll 13 and further cooled by the air knife 25 to obtain an ETFE film 3.

The obtained ETFE film is wound by the winding roll 17 in a roll shape.

The production of an ETFE film in the second embodiment can be carried out in the same manner as in the first embodiment, except for cooling the primary cooled product by the air knife 25 instead of contacting with the second cooling roll 15.

The cooling by the air knife 25 is carried out by blowing a laminar air flow to the primary cooled product.

The cooling conditions at that time are set so that the temperature of the obtainable ETFE film 3 (the cooling temperature) becomes to be at least (Tm—120° C.) and at most (Tm—80° C.) within a predetermined cooling time. The preferred ranges of the cooling temperature and the cooling time are the same as in the first embodiment.

The temperature of the air blown from the air knife 25 is preferably at most 80° C., particularly preferably at most 70° C.

The flow rate of the air blown from the air knife 25 is preferably from 10 to 20 m/sec., particularly preferably from 12 to 18 m/sec. When the flow rate of the air is at least 10 m/sec., the time for cooling the primary cooled product to the desired temperature will be sufficiently short. When the flow rate of the air is at most 20 m/sec., it is possible to suppress flapping of the primary cooled product.

The distance from the position for peeling the primary cooled product of the first cooling roll 13 to the air knife 25 is preferably from 2 to 15 cm, particularly preferably from 3 to 10 cm.

In this embodiment, like the first embodiment, by installing a non-contact temperature sensor for plastic film measurement at the position where the primary cooled product reaches after a predetermined cooling time from peeled from the first cooling roll 13, and measuring the surface temperature of the film, it can be confirmed whether or not the primary cooled product is quenched to the above cooling temperature. The preferred ranges of the retention time and the cooling time are the same as in the first embodiment.

Third Embodiment

Figure 3:
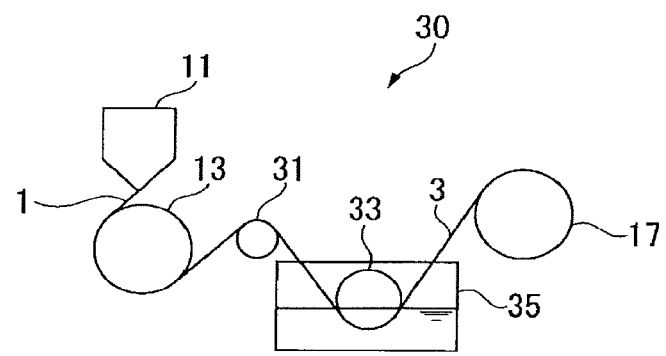
FIG. 3 is a schematic diagram illustrating a third embodiment of the production method (i).

A production apparatus 30 in FIG. 3 comprises a die 11 in an extrusion molding apparatus (not shown), a first cooling roll 13 (first cooling means), and a plurality of guide rolls 31 and 33, a water tank 35 (second cooling means) and a winding roll 17.

The water tank 35 contains water for cooling the primary cooled product.

The production apparatus 30 is the same as the production apparatus 10 except that a water tank 35 is provided instead of the second cooling roll 15, and further a plurality of guide rolls 31 and 33 are provided.

By the production apparatus 30, an ETFE film is produced by the following procedure.

The primary cooling is carried out in the same manner as described above, and then the obtained primary cooled product is peeled from the first cooling roller 13 by the guide roll 31, introduced into the water tank 35 by the guide roll 33, and immersed in water in the water tank 35 and thereby further cooled, to obtain an ETFE film 3.

The obtained ETFE film is wound by the winding roll 17 in a roll shape.

The production of an ETFE film in the third embodiment can be carried out in the same manner as in the first embodiment, except that the primary cooled product is cooled by immersing it in water in the water tank 35 instead of contacting it with the second cooling roll 15.

The cooling conditions at that time are set so that the temperature of the obtainable ETFE film 3 (the cooling temperature) becomes to be at least (Tm—120° C.) and at most (Tm—80° C.) within a predetermined cooling time. The preferred ranges of the cooling temperature and the cooling time are the same as in the first embodiment.

The time from peeling of the primary cooled product from the first cooling roll 13 to entering in water in the water tank 35, is preferably within one second. If the time exceeds 1 second, the temperature of the primary cooled product drops before being immersed in water, whereby the complete crystal is likely to be large. The distance from the position for peeling of the primary cooled product from the first cooling roll 13 to the water tank 35 is, from such a viewpoint that the primary cooled product will readily be introduced into the water tank 35, preferably at most 15 cm, more preferably from 3 to 15 cm, particularly preferably from 3 to 12 cm.

The temperature of the water in the water tank 35 is preferably at most 80° C., particularly preferably at most 70° C.

The time during which the primary cooled product is immersed in water in the water tank 35 in the water tank is preferably at least 3 seconds.

In this embodiment, the primary cooled product is peeled from the first cooling roll 13, then immersed in the water tank 35 within a predetermined time, and taken out in the air at the position after one second from immersed in the water tank 35, whereby at that position, the surface temperature of the film is measured by a non-contact temperature sensor for measuring plastic film. In a case where the film surface temperature is at the above-mentioned cooling temperature, it can be judged to have been quenched.

In the forgoing, the production method (i) has been described with reference to the first to third embodiments, but the present invention is not limited to the above embodiments. The respective constructions of the above embodiments and their combinations are exemplary, and within a range not to depart from the concept of the present invention, additions, omissions, substitutions and other modifications of the constructions are possible.

For example, although examples have been shown in which the cooling of the primary cooled product is carried out by contact with a cooling roll, an air knife, or immersion in water, other cooling means other than these may be used.

In the production apparatus 10, 20 and 30, in the vicinity of the die 11, a pressing roll or electrostatic pinning may be disposed in order to let the melt extruded from the die 11 be in close contact with the surface of the first cooling roll 13. In the electrostatic pinning, electrodes are provided, and by applying a voltage to the electrodes, the static electricity is generated, and, by its action, the melt and the first cooling roll are brought in close contact with each other. By the electrodes, adhesion between the melt and the first cooling roll 13 is increased, whereby unevenness in the temperature is reduced.

In the production apparatus 10, 20 and 30, a temperature-adjustable chamber may be disposed in the vicinity of the outlet of the die 11, and in this chamber, the first cooling roll 13 may be disposed. In such a case, by adjusting the temperature in the chamber to be at least Tc and at most Tm of ETFE, it is prevented that the temperature of the melt 1 becomes at most Tc during the period from the outlet of the die 11 until it contacts the first cooling roller 13.

In the production apparatus 10, 20 and 30, in the vicinity of the exit of the die 11, an original roll having irregularities formed on its surface may be disposed, and the melt 1 may be passed between the original roll and the first cooling roll 13, to continuously transfer the irregularities formed on the surface of the original roll to one side of the melt 1. In such a case, an ETFE film having irregularities formed on one side can be obtained.

By the production method (i), it is possible to produce ETFE film (I), i.e. an ETFE film, of which the crystallinity is from 55 to 70% and the proportion of the quasi-crystal layer is from 10 to 20%.

Here, by the above-mentioned production methods described in Patent Documents 2 to 4, it is difficult to make both of the crystallinity and the proportion of the quasi-crystal layer to be within the above ranges. By these methods, if the crystallinity is in the above range, the proportion of the quasi-crystal layer becomes to be less than 10%, and if the proportion of the quasi-crystalline layer is within the above range, the crystallinity exceeds 70%.

In Ex. 3 in EXAMPLES in Patent Document 2, an ETFE film having 2 types of ETFE mixed was produced, but stretchability of this ETFE film was low. This is considered to be because hardly crystallizable ETFEs were mixed with each other, whereby both the complete crystal layer and the quasi-crystal layer did not grow sufficiently.

Patent Document 3 discloses an ETFE film produced by setting the surface temperature of a cooling roll to be from 80 to 140° C., and blowing hot air of from 50 to 160° C. to the film on this cooling roll, but stretchability of this ETFE film was low. This is considered to be because both of the roll temperature and the temperature of hot air were too low, whereby the quasi-crystal layer did not sufficiently grow.

Patent Document 4 discloses an ETFE film of which the crystallinity is low and the transparency is high, but, stretchability of this ETFE film is low. This is considered to be because the cooling roll temperature was too low, whereby the quasi-crystal layer did not sufficiently grow.

[Process for Producing Semiconductor Device]

The above-described ETFE film (I), ETFE film (II) or ETFE film obtained according to the production method of the present invention is useful as a release film for the production of a semiconductor device (hereinafter referred to also as a "release film") to be used, for example, in the following process for producing a semiconductor device.

A process for producing a semiconductor device comprising a step of disposing a release film for the production of a semiconductor device on the surface of a mold to be in contact with a curable resin, a step of disposing in the mold a structure comprising a semiconductor chip and a substrate on which the semiconductor chip is mounted, filling a curable resin in a space in the mold and curing it to form a resin sealing portion, thereby to obtain a sealed body having said structure and said resin sealing portion, and a step of releasing the sealed body from the mold.

In such a production process, the release film is, for example at the time of forming a resin sealing portion, disposed to cover the surface (hereinafter referred to as the "cavity surface") forming a cavity of a mold, which has the cavity (space) of a shape corresponding to the shape of the resin sealing portion, and disposed between the formed resin sealing portion and the cavity surface of the mold, so that release of the obtained sealed body from the mold will be facilitated.

At the time of forming the resin sealing portion, the release film may be in close contact with at least part of the surface of the semiconductor chip. It is thereby possible to prevent entry of the curable resin into that part, whereby it is possible to obtain a semiconductor device having part of the semiconductor chip exposed.

The semiconductor device may be a transistor, an integrated circuit having a diode, etc. integrated, a light emitting diode having a light-emitting element, etc.

The package shape of the integrated circuit may be one that covers the entire integrated circuit, or one that covers a portion of the integrated circuit (exposes a portion of the integrated circuit), and, as a specific example, BGA (Ball Grid Array), QFN (Quad Flat Non-leaded package), or SON (Small Outline Non-leaded package) may be mentioned.

As the semiconductor device, from the viewpoint of productivity, preferred is one produced through batch encapsulation and singulation, and, as a specific example, an integrated circuit wherein the sealing system is a MAP (Molded Array Packaging) system or a WL (Wafer Label packaging) system, may be mentioned.

As the semiconductor device, from the viewpoint of usefulness of the present invention, preferred is one wherein the thickness of the resin sealing portion is thick, i.e. one wherein the depth of the mold cavity is deep, and, for example, a NAND type flash memory, a power device, or a sensor may be mentioned. The thickness of the resin sealing portion is preferably from 0.5 to 3.0 mm.

As a method for producing a semiconductor device, it is possible to adopt a known method. Production conditions may also be the same conditions as the conditions in the known method for producing a semiconductor device.

As a method for forming the resin sealing portion, a compression molding method is preferred. As an apparatus to be used at that time, it is possible to use a known compression molding apparatus.

Figure 4:
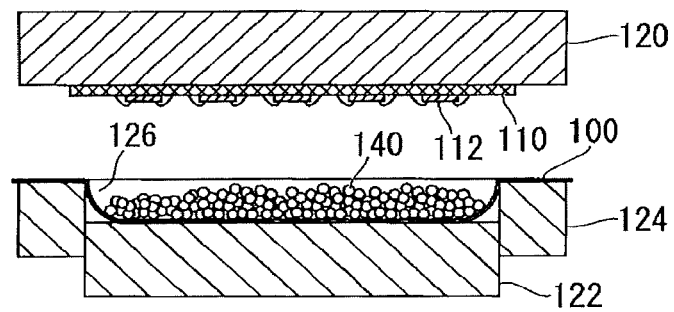
FIG. 4 is a cross-sectional view illustrating steps (1) and (2) in an embodiment of the process for producing a semiconductor device.
Figure 5:
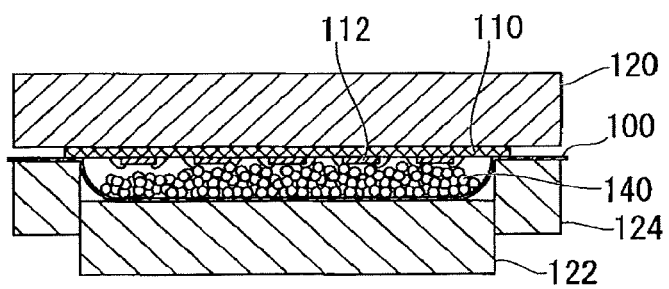
FIG. 5 is a cross-sectional view illustrating a step (3) in an embodiment of the process for producing a semiconductor device.
Figure 6:
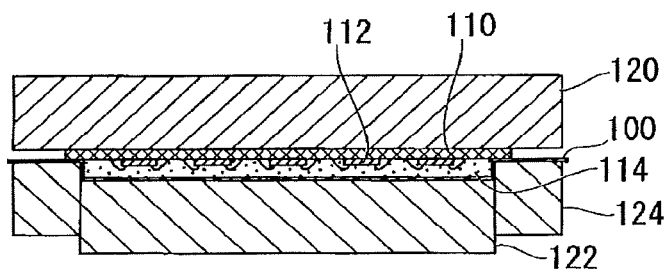
FIG. 6 is a cross-sectional view illustrating a step (3) in an embodiment of the process for producing a semiconductor device.

With reference to FIGS. 4 to 6, an embodiment of the method for producing a semiconductor device by a compression molding method will be described.

The method for producing a semiconductor device in this embodiment comprises the following steps (1) to (5).

Step (1): In a mold having a fixed upper mold 120, a cavity bottom surface member 122 and a frame-form movable lower mold 124 disposed along the periphery of the cavity bottom surface member 122, a step of disposing a release film 100 so that the release film 100 covers the cavity 126 of the mold, and vacuum suctioning it to the cavity bottom surface member 122 side of the mold (FIG. 4).

Step (2): a step of filling a curable resin 140 in the cavity 126 whose surface is covered by the release film 100, and disposing a structure comprising a substrate 110 and a plurality of semiconductor chips 112 mounted on the substrate 110, at a predetermined position in the cavity 126 (FIG. 4).

Step (3): a step of clamping the mold (FIG. 5), so that only the cavity bottom surface member 122 is raised, and the curable resin 140 is melted and cured, to form a resin sealing portion 114 for collectively sealing a plurality of semiconductor chips 112 (FIG. 6), thereby to obtain a collectively sealed body having the substrate 110, the plurality of semiconductor chips 112 and the resin sealing portion 114.

Step (4): a step of taking out the collectively sealed body from the mold.

Step (5): a step of cutting the substrate 110 and the resin sealing portion 114 of the collectively sealed body, so that the plurality of semiconductor chips 112 are separated, to obtain semiconductor devices, each having a substrate 110, at least one semiconductor chip 112 mounted on the substrate 110 and a resin sealing portion 114 sealing the semiconductor chip 112.

As the release film 100, the above-described ETFE film (I) or (II) is used.

However, the method for producing a semiconductor device is not limited to the above embodiment. In the above embodiment, the respective constructions and their combinations are exemplary, and within a range not to depart from the concept of the present invention, additions, omissions, substitutions and other modifications of the constructions are possible.

The timing for disposing the release film 100 and the curable resin 140 in the cavity 126 may be such that after preliminarily disposing the curable resin 140 on the release film 100, the release film 100 in that state, may be disposed so as to cover the cavity 126.

The timing for vacuum suctioning the release film 100 to the cavity bottom surface member 122 side of the mold may be after clamping the mold.

The timing for peeling the release film 100 and the collectively sealed body is not limited to the time for taking out the collectively sealed body from the mold. For example, the collectively sealed body may be taken out together with the release film from the mold, and then, the release film may be peeled from the collectively sealed body.

The distances between the plurality of collectively sealed semiconductor elements may be uniform or non-uniform. From such a viewpoint that sealing can be made to be homogeneous, and the load exerted to the plurality of semiconductor elements respectively, will be uniform (the load becomes minimum), it is preferred to make the distance between the plurality of semiconductor elements to be uniform.

The mold is not limited to one shown in FIGS. 4 to 6, and it is possible to use a known one as a mold to be used in a compression molding method.

After the step (4) or (5), a step of forming an ink layer on the surface of the resin sealing portion 114 by using an ink, may be conducted. However, in the case of producing a light emitting diode as the semiconductor device, the resin sealing portion functions also as a lens unit, and therefore, no ink layer is usually formed on the surface of the resin sealing portion.

The semiconductor device to be produced is not limited to one shown in the above embodiment. Depending on a semiconductor device to be produced, the step (5) may not be conducted. The semiconductor device to be sealed in the resin sealing portion may be one or more. The shape of the resin sealing portion is not limited to the rectangle as shown in FIG. 6, and there may be steps, etc. In a case where the resin sealing portion is a lens portion, as the shape of the resin sealing portion, it is possible to employ various lens shapes, such as a substantially hemispherical type, a shell type, a Fresnel lens type, a semi-cylindrical type, a hemispherical lens array type, etc.

EXAMPLES

In the following, the present invention will be described in detail with reference to Examples. However, the present invention is not limited by the following description.

Among Ex. 1 to 28 as described below, Ex. 1 to 5 and 17 to 23 are Examples of the present invention, and Ex. 6 to 16 and 24 to 28 are Comparative Examples.

The evaluation methods and materials used in the respective Ex. are shown below.

[Evaluation Methods]

(Thickness)

The thickness (μm) of an ETFE film was measured in accordance with ISO 4591: 1992: (JIS K7130: 1999 B1 method, Method for measuring the thickness of a sample taken from a plastic film or sheet by a mass method).

(Crystallinity and Proportion of Quasi-Crystal Layer)

The crystallinity and the proportion of the quasi-crystal layer of an ETFE film were obtained from the integrated intensities of the diffraction peaks obtained by an X-ray diffraction method.

A sample was prepared by cutting an ETFE film into the following shape. The prepared sample was adhered to a quartz plate for a sample and fixed to a sample stage, whereupon the X-ray diffraction measurement was carried out by using a powder X-ray diffractometer.

Shape of the sample: a film with a thickness of 50 μm and a size of 1.5 cm×1.5 cm Measuring apparatus: D2 PHASER manufactured by Bruker Co.

Measuring method: 2θ/θ method

Measurement range: 2θ=10 to 30°

X-ray intensity: 30 kV, 10 mA

X source: CuKα ray

Analysis software: TOPAS Ver. 4.2 manufactured by Bruker Co.,

Measurement temperature: room temperature (20 to 25° C.)

With respect to the obtained diffraction intensity curve, curve fitting was carried out by using the analysis software. Using, as the function, Pearson vii function, curve fitting was carried out so that the difference between the fitting curve and the actual curve would be at most 10%. Using a peak separation method, by setting the peak position of the non-crystalline portion to be at 2θ=17.268°, and with respect to two crystal peaks, 20° and 19° to be the starting points, optimization of the curve was automatically detected. The half width of the peak was automatically optimized. There were two crystal peaks, and their respective area ratios were obtained.

From the peak area $S_{20}$ in the vicinity of 2θ=20°, the peak area $S_{19}$ in the vicinity of 2θ=19° and the peak area $S_{17}$ in the vicinity of 2θ=17°, the crystallinity (%) was obtained by the following formula (1), and the proportion of the quasi-crystal layer was obtained by the following formula (2).

$$\text{Crystallinity (\%)} = (S_{19}+S_{20})/(S_{17}+S_{19}+S_{20}) \times 100 \quad (1)$$

$$\text{Proportion of quasi-crystal layer (\%)} = S_{20}/(S_{17}+S_{19}+S_{20}) \times 100 \quad (2)$$

(Breakage During Molding, Wrinkles During Molding)

Using an ETFE film produced in each Ex. as a release film, a compression molding test according to the following procedure was carried out under the following conditions.

In the test, a compression molding apparatus for sealing semiconductor PMC1040 (trade name, manufactured by TOWA Corporation) was used. The compression molding apparatus for sealing semiconductor PMC1040 is one provided with a mold as shown in FIG. 4 (a fixed upper mold 120, a cavity bottom surface member 122, and a movable lower mold 124).

<Compression Molding Procedure>

In the compression molding apparatus for sealing semiconductor PMC1040, a release film (an ETFE film) is unwound from a roll, fixed on a stage, and then cut in a predetermined length. Thereafter, a curable resin is put on the release film, and, in that state, conveyed onto a cavity formed by the cavity bottom surface member 122 and the movable lower mold 124. After the release film is placed on the cavity, the fixed upper mold 120 and the movable lower mold 124 are clamped, and air is evacuated by a vacuum pump from vacuum suction holes at the cavity peripheral portion, to let the release film follow the cavity surface and withdraw air bubbles from the curable resin. Thereafter, the cavity bottom surface member 122 is raised to bring about a predetermined final depth and clamping force, and that state is maintained for a predetermined clamping time to carry out the compression molding.

<Compression Molding Conditions>

Mold temperature: 180° C.

Cavity size: 210 mm×70 mm.

Initial depth of the cavity: 1.8 mm.

Final depth of the cavity: 0.6 mm.

Curable resin: Sum ikon EME G770H type F Ver. GR (manufactured by Sumitomo Bakelite Co., Ltd.).

Degree of vacuum at the time of following the cavity surface: −85 kPa.

Degree of vacuum at the time of withdrawing air bubbles from the curable resin: −80 kPa.

Time for withdrawing air bubbles from the curable resin: 10 seconds.

Clamping time: 150 seconds.

Clamping force: $9.8 \times 10^4$ N.

After molding, the side surface of the resin sealing portion was observed to confirm wrinkles. Further, the film was observed, to evaluate the state of breakage according to the following standards.

<Breakage During Molding>

◯ (good): By visual observation, no pinhole in the ETFE film was confirmed.

x (bad): By visual observation, pinholes in the ETFE film were confirmed.

<Wrinkles During Molding>

◯ (good): On the side surface of the resin sealing portion, no dent caused by biting of the ETFE film was observed.

x (bad): On the side surface of the resin sealing portion, dents caused by biting of the ETFE film were observed.

However, with respect to one, of which the result of evaluation of breakage during molding was bad, the resin leaked from the break point of the film, and judgment of wrinkles was difficult, and therefore, evaluation of wrinkles was not carried out.

[Materials Used]

Resin 1: Copolymer of TFE units/E units/PFBE units=57.1/42.9/1.3 (molar ratio) (MFR: 15 g/10 min., Tc: 241° C., Tm: 253° C., manufactured by Daikin Industries Ltd. "EP-526").

Resin 2: Copolymer of TFE units/E units/PFBE units=55.8/44.2/1.4 (molar ratio) (MFR: 12 g/10 min., Tc: 243° C., Tm: 257° C., synthetic product produced by Production Example 1 given below).

Resin 3: Copolymer of TFE units/E units/PFBE units=58.5/41.5/3.7 (molar ratio) (MFR: 15 g/10 min., Tc:

209° C., Tm: 222° C., synthetic product produced by Production Example 2 given below).

Resin 4: Copolymer of TFE units/E units/PFBE units=58.3/41.70/7.0 (molar ratio) (MFR: 16.2 g/10 min., Tc: 183° C., Tm: 195° C., synthetic product produced by Production Example 3 given below).

Resin 5: Blend resin of resin 1/resin 3=95/5 (mass ratio) (Tc: 239° C., Tm: 251° C.).

Resin 6: Blend resin of resin 1/resin 3=85/15 (mass ratio) (Tc: 236° C., Tm: 248° C.).

Resin 7: Blend resin of resin 2/resin 3=95/5 (mass ratio) (Tc: 241° C., Tm: 255° C.).

Resin 8: Blend resin of resin 1/resin 3=75/25 (mass ratio) (Tc: 241° C. and 212° C., Tm: 253° C. and 227° C.).

Resin 9: Blend resin of resin 1/resin 3=99/1 (mass ratio) (Tc: 241° C., Tm: 253° C.).

Resin 10: Blend resin of resin 1/resin 2=90/10 (mass ratio) (Tc: 241° C., Tm: 253° C.).

Resin 11: Blend resin of resin 3/resin 4=90/10 (mass ratio) (Tc: 196° C., Tm: 209° C.).

Resins 5 to 11 were obtained by blending the respective resins in the above mass ratios, by the following method for producing a blend resin.

Tc and Tm of resins 1 to 4 were, respectively, obtained by the above-mentioned procedures, by using a scanning differential thermal analyzer (manufactured by SII NanoTechnology, Inc., DSC220CU).

With respect to resins 5 to 7 and 9 to 11 being blend resins, Tc was calculated by the above-mentioned formula (3), and Tm was calculated by the above-mentioned formula (4). With respect to these blend resins, the values of Tc and Tm were obtained by the above-mentioned measurement method using a differential scanning calorimetry analyzer, whereby they were consistent with the calculated values.

In resin 8, the two resins were not uniformly mixed and completely separated, whereby no calculation of Tc according to formula (3) and Tm according to the formula (4) was carried out. With respect to these blend resins, the values of Tc and Tm were obtained by the above measuring method using the scanning differential thermal analyzer, whereby two values were, respectively, observed.

Production Example 1

Into a vacuum-aspirated 94 L stainless steel autoclave, 107.7 kg of 1-hydrotridecafluorohexane, 41.0 kg of 1,3-dichloro-1,1,2,2,3-pentafluoropropane (trade name "AK225cb" manufactured by Asahi Glass Co., Ltd., hereinafter referred to also as "AK225cb") and 0.85 kg of PFBE were charged, and with stirring, the temperature was raised to 66° C., whereupon a mixed gas of monomers of TFE/ethylene=89/11 (molar ratio) was introduced until the pressure became 1.5 MPaG, and 30.2 g of a 50 mass % tert-butyl peroxypivalate AK225cb solution was charged to initiate polymerization. During the polymerization, a mixed gas of TFE/ethylene=54/46 (molar ratio) and PFBE in an amount corresponding to 1.4 mol % to the mixed gas, were continuously added, so that the pressure became 1.5 MPaG, and after charging the mixed gas of TFE/ethylene=54/46 (molar ratio) in a total of 7.19 kg, the autoclave was cooled, and the residual gas was purged to terminate the polymerization. The time required for the polymerization was 305 minutes. The obtained slurry of ETFE was transferred to a 220 L granulation tank, and 77 L of water was added, followed by heating with stirring to remove the polymerization solvent and residual monomers to obtain 7.2 kg of a granular resin 2.

Here, G in "MPaG" indicates that it is a gauge pressure, and the same applies hereinafter.

Production Example 2

Into a vacuum-aspirated 94 L stainless steel autoclave, 85.2 kg of 1-hydrotridecafluorohexane, 6.31 kg of AK225cb and 1.22 kg of PFBE were charged, and the temperature was raised to 66° C. with stirring, whereupon a mixed gas of TFE/ethylene=89/11 (molar ratio) was introduced until the pressure became 1.5 MPaG, and 30.2 g of a 50 mass % tert-butyl peroxypivalate AK225cb solution was charged to initiate polymerization. During the polymerization, a mixed gas of TFE/ethylene=60/40 (molar ratio) and PFBE in an amount corresponding to 3.8 mol % to the mixed gas were continuously added so that the pressure became 1.5 MPaG, and after charging the mixed gas of TFE/ethylene=60/40 (molar ratio) in total of 7.19 kg, the autoclave was cooled, and the residual gas was purged to terminate the polymerization. The time required for the polymerization was 305 minutes. The obtained slurry of ETFE was transferred to a 220 L granulation tank, and 77 L of water was added, followed by heating with stirring, to remove the polymerization solvent and residual monomers to obtain 7.5 kg of a granular resin 3.

Production Example 3

Into a vacuum-aspirated 94 L stainless steel autoclave, 87.3 kg of 1-hydrotrideca fluorohexane, 4.21 kg of AK225cb and 2.13 kg of PFBE were charged, and the temperature was raised to 66° C. with stirring, whereupon a mixed gas of TFE/ethylene=89/11 (molar ratio) was introduced until the pressure became 1.5 MPaG, and 60.4 g of a 50 mass % tert-butyl peroxypivalate AK225cb solution was charged to initiate polymerization. During the polymerization, a mixed gas of TFE/ethylene=60/40 (molar ratio) and PFBE in an amount corresponding to 7.0 mol % to the mixed gas, were continuously added so that the pressure became 1.5 MPaG, and after charging the mixed gas of TFE/ethylene=60/40 in total of 7.19 kg, the autoclave was cooled, and the residual gas was purged to terminate the polymerization. The time required for the polymerization was 333 minutes. 220 L of the obtained slurry of ETFE was transferred to a granulation tank, and 77 L of water was added, followed by heating with stirring to remove the polymerization solvent and residual monomers to obtain 7.2 kg of a granular resin 4.

(Method for Producing Blended Resin Pellets)

Using a twin screw extruder with a diameter of 15 mm and L/D (cylinder length/cylinder inner diameter)=30, two types of resin pellets were mixed in a predetermined mass ratio and supplied to produce blended resin pellets. The temperature of the extruder was set to be 320° C.

Ex. 1

The resin 5 is supplied to an extrusion molding apparatus with a T-die, melted and extruded through the T-die in the form of a film, which was taken on the first cooling roll and maintained in a state in contact with the surface of the first cooling roll for 10 seconds to form an ETFE film having a thickness of 50 μm. The temperature at the melt-kneading portion and the T-die portion in the extruder (hereinafter referred to as the "extrusion temperature") was set to be 340° C.; the surface temperature of the first cooling roll was set to be 80° C.; the take-off speed was set to be 5 m/min.; and the air gap between the T-die and the first cooling roll was set to be 15 mm. At the time of taking-off, the molten resin 5 was brought into close contact with the first cooling roll by the electrostatic pinning. Just before contact with the first cooling roll, the surface temperature of the molten resin 5 was 330° C.

Ex. 2 to 16

An ETFE film having a thickness of 50 μm was obtained in the same manner as in Ex. 1, except that the type of the resin, the surface temperature of the first cooling roll, the air gap, and the presence or absence of the electrostatic pinning (contact method to the first cooling roll) were set as shown in Tables 1 and 2.

Ex. 17

The resin 1 was extruded from the same extrusion molding apparatus as in Ex. 1 in the form of a film, which was taken on the first cooling roll while conducting the electrostatic pinning, and maintained in a state in contact with the surface of the first cooling roll for 10 seconds, whereupon the obtained primary cooled product was peeled off from the first cooling roll, then brought in contact with the second cooling roll having a surface temperature of 100° C. and thus cooled to 150° C., to form an ETFE film having a thickness of 50 μm. The extrusion temperature was set to be 340° C.; the surface temperature of the first cooling roll was set to be 250° C.; the take-up speed was set to be 5 m/min.; and the air gap between the T-die and the first cooling roll was set to be 15 mm. The temperature of the ETFE film after 1 second from the peeled point of time (hereinafter referred to also as the "film temperature immediately after cooling") was 150° C.

Ex. 18 to 28

An ETFE film having a thickness of 50 μm was obtained in the same manner as in Ex. 17, except that the type of the resin, the die temperature, the surface temperature of the first cooling roll, the type and cooling conditions of the cooling device for cooling the primary cooled product, and the film temperature immediately after cooling, were set to be as shown in Tables 3 and 4.

With respect to the ETFE film obtained in each Ex., the evaluation results of the crystallinity, the proportion of the quasi-crystal layer, wrinkles during molding, and breakage during molding, are shown in Tables 1 to 4.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Resin | 5 | 6 | 5 | 5 | 7 | 1 | 2 | 1 |
| Crystallization temperature Tc (° C.) | 239 | 236 | 239 | 239 | 241 | 241 | 243 | 241 |
| Melting point Tm (° C.) | 251 | 248 | 251 | 251 | 255 | 253 | 257 | 253 |
| Extrusion temperature (° C.) | 340 | 340 | 340 | 340 | 340 | 340 | 340 | 340 |
| Air gap (mm) | 15 | 15 | 15 | 15 | 15 | 15 | 15 | 15 |
| Contact method to first cooling roll | Electrostatic pining | Electrostatic pining | Electrostatic pining | Nil | Electrostatic pining | Electrostatic pining | Electrostatic pining | Electrostatic pining |
| Surface temperature (° C.) immediately before contact with first cooling roll | 330 | 330 | 330 | 330 | 330 | 330 | 330 | 330 |
| Surface temperature (° C.) of first cooling roll | 80 | 80 | 150 | 80 | 80 | 80 | 80 | 100 |
| Cooling device for primary cooled product | Nil | Nil | Nil | Nil | Nil | Nil | Nil | Nil |
| Cooling condition | — | — | — | — | — | — | — | — |
| Film temperature (° C.) immediately after cooling | 100 | 100 | 100 | 100 | 100 | 100 | 100 | 120 |
| Crystallinity (%) | 60 | 56 | 70 | 68 | 60 | 67 | 67 | 68 |
| Proportion (%) of quasi-crystal | 11 | 11 | 12 | 17 | 11 | 2 | 2 | 6 |
| Breakage during molding | ○ | ○ | ○ | ○ | ○ | ○ | ○ | ○ |
| Wrinkles during molding | ○ | ○ | ○ | ○ | ○ | x | x | x |

TABLE 2

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Resin | 1 | 1 | 1 | 3 | 8 | 9 | 10 | 11 |
| Crystallization temperature Tc (° C.) | 241 | 241 | 241 | 209 | 241/212 | 241 | 241 | 196 |
| Melting point Tm (° C.) | 253 | 253 | 253 | 222 | 253/227 | 253 | 253 | 209 |
| Extrusion temperature (° C.) | 340 | 340 | 340 | 340 | 340 | 340 | 340 | 340 |
| Air gap (mm) | 15 | 150 | 15 | 15 | 15 | 15 | 15 | 15 |
| Contact method to first cooling roll | Electrostatic pining | Electrostatic pining | Nil | Electrostatic pining | Electrostatic pining | Electrostatic pining | Electrostatic pining | Electrostatic pining |
| Surface temperature (° C.) immediately before contact with first cooling roll | 330 | 330 | 330 | 330 | 330 | 330 | 330 | 330 |
| Surface temperature (° C.) of first cooling roll | 150 | 80 | 80 | 80 | 80 | 80 | 80 | 100 |
| Cooling device for primary cooled product | Nil | Nil | Nil | Nil | Nil | Nil | Nil | Nil |

TABLE 2-continued

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Cooling condition | — | — | — | — | — | — | — | — |
| Film temperature (° C.) immediately after cooling | 160 | 100 | 100 | 100 | 100 | 100 | 100 | 100 |
| Crystallinity (%) | 83 | 88 | 72 | 50 | 55 | 67 | 67 | 45 |
| Proportion (%) of quasi-crystal | 10 | 10 | 8 | 2 | 4 | 4 | 2 | 1 |
| Breakage during molding | x | x | ○ | x | ○ | ○ | ○ | x |
| Wrinkles during molding | — | — | x | — | x | x | x | — |

TABLE 3

|  | Ex. 17 | Ex. 18 | Ex. 19 | Ex. 20 | Ex. 21 | Ex. 22 | Ex. 23 |
|---|---|---|---|---|---|---|---|
| Resin | 1 | 1 | 1 | 2 | 1 | 3 | 8 |
| Crystallization temperature Tc (° C.) | 241 | 241 | 241 | 243 | 241 | 209 | 241/212 |
| Melting point Tm (° C.) | 253 | 253 | 253 | 257 | 253 | 222 | 253/227 |
| Extrusion temperature (° C.) | 340 | 340 | 340 | 340 | 340 | 310 | 340 |
| Air gap (mm) | 15 | 15 | 15 | 15 | 15 | 15 | 15 |
| Contact method to first cooling roll | Electrostatic pining | Electrostatic pining | Electrostatic pining | Electrostatic pining | Electrostatic pining | Electrostatic pining | Electrostatic pining |
| Surface temperature (° C.) immediately before contact with first cooling roll | 330 | 330 | 330 | 330 | 330 | 300 | 330 |
| Surface temperature (° C.) of first cooling roll | 250 | 250 | 250 | 250 | 250 | 210 | 240 |
| Cooling device for primary cooled product | Second cooling roll | Air knife | Water tank | Second cooling roll | Second cooling roll | Second cooling roll | Second cooling roll |
| Cooling condition | Surface temperature 100° C. | Air temperature 60° C., Air flow rate 15 m/min | Water temperature 70° C. | Surface temperature 100° C. | Surface temperature 70° C. | Surface temperature 90° C. | Surface temperature 90° C. |
| Film temperature (° C.) immediately after cooling | 150 | 150 | 150 | 150 | 130 | 120 | 140 |
| Crystallinity (%) | 65 | 65 | 65 | 65 | 58 | 55 | 58 |
| Proportion (%) of quasi-crystal | 15 | 15 | 15 | 15 | 17 | 10 | 17 |
| Breakage during molding | ○ | ○ | ○ | ○ | ○ | ○ | ○ |
| Wrinkles during molding | ○ | ○ | ○ | ○ | ○ | ○ | ○ |

TABLE 4

|  | Ex. 24 | Ex. 25 | Ex. 26 | Ex. 27 | Ex. 28 |
|---|---|---|---|---|---|
| Resin | 2 | 2 | 1 | 1 | 3 |
| Crystallization temperature Tc (° C.) | 243 | 243 | 241 | 241 | 209 |
| Melting point Tm (° C.) | 257 | 257 | 253 | 253 | 222 |
| Extrusion temperature (° C.) | 340 | 340 | 340 | 340 | 310 |
| Air gap (mm) | 15 | 15 | 15 | 15 | 15 |
| Contact method to first cooling roll | Electrostatic pining | Electrostatic pining | Electrostatic pining | Electrostatic pining | Electrostatic pining |
| Surface temperature (° C.) immediately before contact with first cooling roll | 330 | 330 | 330 | 330 | 300 |
| Surface temperature (° C.) of first cooling roll | 250 | 230 | 230 | 250 | 200 |
| Cooling device for primary cooled product | Nil | Second cooling roll | Second cooling roll | Second cooling roll | Second cooling roll |
| Cooling condition | — | Surface temperature 110° C. | Surface temperature 110° C. | Surface temperature 50° C. | Surface temperature 60° C. |
| Film temperature (° C.) immediately after cooling | 220 | 150 | 150 | 100 | 100 |
| Crystallinity (%) | 90 | 90 | 90 | 50 | 58 |
| Proportion (%) of quasicrystal | 10 | 10 | 10 | 18 | 3 |
| Breakage during molding | ○ | x | x | x | ○ |
| Wrinkles during molding | x | — | — | — | x |

As shown in the above results, with the ETFE films in Ex. 1 to 5 and 17 to 23, the crystallinity was from 55 to 70%, and the proportion of the quasi-crystal layer was from 10 to 20%. And, the evaluation results of wrinkles and breakage during molding were also excellent, and they were excellent also in stretchability.

On the other hand, with the ETFE films in Ex. 6 to 16 and 24 to 28, wherein as ETFE, ETFE (A) and ETFE (B) were not used in the ratio within a range of from 80/20 to 95/5, or the surface temperature of the first cooling roll was at most Tc, at least one of the crystallinity and the proportion of the quasi-crystal layer was out of the above-mentioned range. Further, the stretchability was bad, whereby the evaluation result of breakage during molding was bad, or otherwise, the evaluation result of wrinkles during molding was bad.

Specifically, with the ETFE films in Ex. 6 to 8, wherein the resin 1 or 2 corresponding to ETFE (A) was used alone, and the surface temperature of the first cooling roll was set to be at most Tc, there was no component which inhibits the growth of the complete crystal layer, and the complete crystal layer was grown more predominantly than the quasi-crystal layer, whereby the proportion of the quasi-crystal layer was low. Further, the evaluation result of wrinkles during molding was bad.

In the ETFE film in Ex. 9 which was carried out under the same conditions as in Ex. 6 and 8 except that the surface temperature of the first cooling roll was set to be a temperature higher than in Ex. 6 and 8 although it was at most Tc, the temperature of the first cooling roll was at most Tc, and it was in contact with the hot roll, whereby the complete crystal layer was more likely to grow, and the crystallinity was high. Further, the evaluation result of breakage during molding was bad.

With the ETFE film in Ex. 10 which was carried out under the same conditions as in Ex. 6 except that the air gap was 150 mm, the crystallization started before being in contact with the first cooling roll, and it was slowly cooled in air, whereby a stable crystal was more likely to grow, and the crystallinity was high. Further, the evaluation result of breakage during molding was bad.

With the ETFE film in Ex. 11 which was carried out in the same manner as in Ex. 6 except that electrostatic pinning was not conducted, both the crystallinity and the proportion of the quasi-crystal were high. Further, the evaluation result of wrinkles during molding was bad. This is considered to be because adhesion between the molten ETFE film and the first cooling roll was low.

With the ETFE film in Ex. 12 wherein the resin 3 corresponding to ETFE (B) was used alone, and the surface temperature of the first cooling roll was set to be at most Tc, monomers other than TFE and ethylene, inhibiting crystallization, were substantially contained, whereby the crystallinity was low. Further, the evaluation result of breakage during molding was bad.

With the ETFE film in Ex. 13, where resin 8 obtained by blending the resin 1 corresponding to ETFE (A) and the resin 3 corresponding to ETFE (B) in a mass ratio of 75/25, was used and the surface temperature of the first cooling roll was set to be 80° C., the resin corresponding to ETFE (B) inhibiting the growth of the complete crystal layer was blended too much, whereby ETFE (A) and ETFE (B) became to be a completely incompatible state, and the growth of the complete crystal layer was not sufficiently inhibited, so that the proportion of the quasi-crystal layer was low. Further, the evaluation result of wrinkles during molding was bad.

With the ETFE film in Ex. 14, wherein the resin 9 having the resin 1 and the resin 3 blended in a mass ratio of 99/1, was used, and the surface temperature of the first cooling roll was set to be 80° C., the amount of ETFE (B) was too small, and the growth of the complete crystal layer was not sufficiently inhibited, whereby the proportion of the quasi-crystal layer was low. Further, the evaluation result of wrinkles during molding was bad.

With the ETFE film in Ex. 15 wherein the resin 10 obtained by blending the resin 1 and the resin 2 both corresponding to ETFE (A), was used, and the surface temperature of the first cooling roll was set to be at most Tc, there was no component inhibiting the growth of the complete crystal layer, and the surface temperature of the first cooling roll was at most Tc, whereby the complete crystal was predominantly grown, so that the proportion of the quasi-crystal layer was low. Further, the evaluation result of wrinkles during molding was bad.

With the ETFE film in Ex. 16 wherein the resin 11 obtained by blending the resin 3 corresponding to ETFE (B) and the resin 4 not corresponding to either ETFE (A) or (B) was used, and the surface temperature of the first cooling roll was set to be 80° C., to a resin originally having low crystallinity, another resin having a further lower crystallinity was mixed, both the crystallinity and the proportion of the quasi-crystal layer were low. Further, the evaluation result of breakage during molding was bad.

With the ETFE film in Ex. 24 wherein the resin 2 was used alone, quenching of the primary cooled product was not conducted, and the film temperature immediately after cooling was higher than Tm—80° C., even if the quasi-crystal layer was grown on the first cooling roll, in the subsequent annealing, the quasi-crystal layer was transferred to the complete crystal layer, whereby the crystallinity was high. Further, since the crystallinity was high, the ETFE film was brittle, and the evaluation result of wrinkles during molding was bad.

With the ETFE films in Ex. 25 and 26 wherein the resin 2 or 1 was used alone, and the surface temperature of the first cooling roll was set to be at most Tc, the temperature of the first cooling roll was at most Tc, and the film was in contact with the high temperature roll, whereby the complete crystal was more likely to be grown, and the crystallinity was high. Further, the evaluation result of breakage during molding was bad.

With the ETFE film in Ex. 27 wherein the resin 1 was used alone, the film temperature immediately after cooling was set to be less than Tm—120° C., the film was rapidly cooled from a molten state, and crystallization itself including the complete crystal was less likely to take place, whereby the crystallinity was low. Further, the evaluation result of breakage during molding was bad.

With the ETFE film in Ex. 28 wherein the resin 3 was used alone, and the film temperature immediately after cooling of the primary cooled product was set to be less than Tm—120° C., the proportion of the quasi-crystal layer was low. Further, the evaluation result of wrinkles during molding was bad.

INDUSTRIAL APPLICABILITY

With respect to ETFE film (I), ETFE film (II) and an ETFE film obtainable by the production method (i), their respective applications are not particularly limited, and, as specific examples, release films for the production of semiconductor devices, films for agricultural houses, films for buildings such as tent films, films for chemical storage bags, etc. may be mentioned.

These ETFE films are excellent in stretchability and less likely to be broken or form wrinkles when stretched, and thus, they are highly useful as release films for the production of semiconductor devices, particularly suitable as release films for the production of semiconductor devices by a compression molding method.

This application is a continuation of PCT Application No. PCT/JP2017/024236, filed on Jun. 30, 2017, which is based upon and claims the benefit of priority from Japanese Patent Application No. 2016-132442 filed on Jul. 4, 2016. The contents of those applications are incorporated herein by reference in their entireties.

REFERENCE SYMBOLS

1: melt, 3: ETFE film, 10: production apparatus, 11: die, 13: first cooling roll, 15: second cooling roll, 17: winding roll, 20: production apparatus, 25: air knife, 30: production apparatus, 31 and 33: guide rolls, 35: water tank, 100: release film, 110: substrate, 112: semiconductor chip, 114: resin sealing portion, 120: fixed upper mold, 122: cavity bottom surface member, 124: movable lower mold, 126: cavity, 140: curable resin

What is claimed is:

1. A film being an ethylene-tetrafluoroethylene copolymer film, wherein the ethylene-tetrafluoroethylene copolymer comprises a unit derived from a fluoroalkyl ethylene represented by the formula:

$$X(CF_2)_nCY=CH_2$$

wherein X and Y are each independently a hydrogen atom or a fluorine atom, and n is an integer of from 3 to 8, wherein the crystallinity obtained by the following formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17$ in the diffraction intensity curve obtained by the X-ray diffraction method, is from 55 to 70%, and the proportion of the quasi-crystal layer obtained by the following formula (2) is from 10 to 20%, $$\text{crystallinity }(\%)=(S_{19}+S_{20})/(S_{17}+S_{19}+S_{20})\times 100 \quad (1)$$

$$\text{proportion of quasi-crystal layer }(\%)=S_{20}/(S_{17}+S_{19}+S_{20})\times 100 \quad (2).$$

2. The film according to claim 1, which is a release film for producing a semiconductor device.

3. A method for producing a film according to claim 1, comprising extruding a melt of an ethylene- tetrafluoroethylene copolymer from an extrusion molding apparatus in the form of a film, contacting the film to a first cooling means so that the surface temperature be more than the crystallization temperature of the copolymer and less than the melting point of the copolymer for a predetermined time to obtain the primary cooled product, then peeling the primary cooled product from the first cooling means, and cooling it, within a predetermined time from the peeling point of time, by a second cooling means to a temperature of at least the melting point of the copolymer—120° C. and at most the melting point of the copolymer—80° C.

4. The method for producing the film according to claim 3, wherein the period for contacting the film to the first cooling means, is from 3 to 20 seconds.

5. The method for producing the film according to claim 3, wherein the time for cooling to the above temperature by the second cooling means from the point of time peeled from the first cooling means is within one second.

6. The method for producing the film according to claim 3, wherein the ethylene-tetrafluoroethylene copolymer is a copolymer having tetrafluoroethylene units, ethylene units and third units based on a monomer other than tetrafluoroethylene and ethylene.

7. The method for producing the film according to claim 3, wherein the cooling of the primary cooled product is conducted by contact with a cooling roll, air knife or immersion in water.

8. The method for producing the film according to claim 3, wherein the film is a release film for producing a semiconductor device.

9. A film made of a mixture of the following ETFE (A) and the following ETFE (B) in a mass ratio of from 80/20 to 95/5, ETFE (A): an ethylene-tetrafluoroethylene copolymer having tetrafluoroethylene units, ethylene units and third units based on a monomer other than tetrafluoroethylene and ethylene, wherein the third units comprise a unit derived from a fluoroalkyl ethylene represented by the formula:

$$X(CF_2)_nCY=CH_2$$

wherein X and Y are each independently a hydrogen atom or a fluorine atom, and n is an integer of from 3 to 8, wherein the molar ratio of the tetrafluoroethylene units to the ethylene units is from 45/55 to 65/35, and the proportion of the third units to the total of the tetrafluoroethylene units and the ethylene units is from 0.5 to 1.5 mol %, ETFE (B): an ethylene-tetrafluoroethylene copolymer having tetrafluoroethylene units, ethylene units and third units based on a monomer other than tetrafluoroethylene and ethylene, wherein the third units comprise a unit derived from a fluoroalkyl ethylene represented by the formula $X(CF_2)_nCY=CH_2$ (wherein X and Y are each independently a hydrogen atom or a fluorine atom, and n is an integer of from 3 to 8, wherein the molar ratio of the tetrafluoroethylene units to the ethylene units is from 45/55 to 65/35, and the proportion of the third units to the total of the tetrafluoroethylene units and the ethylene units is from 3.5 to 6 mol %, wherein the crystallinity obtained by the following formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17°$ in the diffraction intensity curve obtained by the X-ray diffraction method, is from 55 to 70%, and the proportion of the quasi-crystal layer obtained by the following formula (2) is from 10 to 20%, $$\text{crystallinity }(\%)=(S_{19}+S_{20})/(S_{17}+S_{19}+S_{20})\times 100 \quad (1)$$

$$\text{proportion of quasi-crystal layer }(\%)=S_{20}/(S_{17}+S_{19}+S_{20})\times 100 \quad (2).$$

10. The film according to claim 9, which is a release film for producing a semiconductor device.

11. A method for producing an ethylene-tetrafluoroethylene copolymer film, comprising extruding a molten mixture of the following ETFE (A) and the following ETFE (B) in a mass ratio of from 80/20 to 95/5 from an extrusion molding apparatus in the form of a film, followed by cooling, ETFE (A): an ethylene-tetrafluoroethylene copolymer having tetrafluoroethylene units, ethylene units and third units based on a monomer other than tetrafluoroethylene and ethylene, wherein the third units comprise a unit derived from a fluoroalkyl ethylene represented by the formula:

$$X(CF_2)_nCY=CH_2$$

wherein X and Y are each independently a hydrogen atom or a fluorine atom, and n is an integer of from 3 to 8, wherein the molar ratio of the tetrafluoroethylene units to the ethylene units is from 45/55 to 65/35, and the proportion of the third units to the total of the tetrafluoroethylene units and the ethylene units is from 0.5 to 1.5 mol %, ETFE (B): an ethylene-tetrafluoroethylene copolymer having tetrafluoroethylene units, ethylene units and third unit based on a monomer other than tetrafluoroethylene and ethylene, wherein the third units comprise a unit derived from a fluoroalkyl ethylene represented by the formula:

$$X(CF_2)_nCY=CH_2$$

wherein X and Y are each independently a hydrogen atom or a fluorine atom, and n is an integer of from 3 to 8, wherein the molar ratio of the tetrafluoroethylene units to the ethylene units is from 45/55 to 65/35, and the proportion of the third units to the total of the tetrafluoroethylene units and the ethylene units is from 3.5 to 6 mol %;

wherein the crystallinity obtained by formula (1) from the peak area $S_{20}$ in the vicinity of $2\theta=20°$, the peak area $S_{19}$ in the vicinity of $2\theta=19°$ and the peak area $S_{17}$ in the vicinity of $2\theta=17°$ in the diffraction intensity curve obtained by the X-ray diffraction method, is from 55 to 70%, and the proportion of the quasi-crystal layer obtained by formula (2) is from 10 to 20%, $$\text{crystallinity (\%)} = (S_{19}+S_{20})/(S_{17}+S_{19}+S_{20}) \times 100 \quad (1)$$

$$\text{proportion of quasi-crystal layer (\%)} = S_{20}/(S_{17}+S_{19}+S_{20}) \times 100 \quad (2).$$

12. The method for producing the film according to claim 11, wherein the film is a release film for producing a semiconductor device.

* * * * *